(12) United States Patent
Nakazono et al.

(10) Patent No.: US 9,366,372 B2
(45) Date of Patent: Jun. 14, 2016

(54) CONNECTING DEVICE

(71) Applicant: HONDA MOTOR CO., LTD., Tokyo (JP)

(72) Inventors: Daisuke Nakazono, Tochigi (JP);
Hiroki Matsunaga, Tochigi (JP);
Masashi Honma, Tochigi (JP);
Norihiko Sudo, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 53 days.

(21) Appl. No.: 14/245,270

(22) Filed: Apr. 4, 2014

(65) Prior Publication Data
US 2014/0217721 A1 Aug. 7, 2014

Related U.S. Application Data

(62) Division of application No. 13/257,274, filed as application No. PCT/JP2010/062645 on Jul. 27, 2010, now abandoned.

(30) Foreign Application Priority Data

Jul. 30, 2009 (JP) .................................. 2009-177518
Jul. 31, 2009 (JP) .................................. 2009-179129
Jul. 31, 2009 (JP) .................................. 2009-179352

(51) Int. Cl.
*B05B 5/00* (2006.01)
*B05B 5/16* (2006.01)
(Continued)

(52) U.S. Cl.
CPC ............... *F16L 45/00* (2013.01); *B05B 5/0407* (2013.01); *B05B 5/1616* (2013.01);
(Continued)

(58) Field of Classification Search
None
See application file for complete search history.

(56) References Cited

U.S. PATENT DOCUMENTS 4,921,169 A 5/1990 Tilly
5,288,029 A * 2/1994 Ishibashi et al. .............. 239/691
(Continued)

FOREIGN PATENT DOCUMENTS

JP 63-502810 A 10/1988
JP 3-242253 A 10/1991
(Continued)

OTHER PUBLICATIONS

Japanese Office Action issued Jun. 18, 2013, in counterpart Japanese Patent Application No. 2009-177518 (3pp).
(Continued)

*Primary Examiner* — Binu Thomas
(74) *Attorney, Agent, or Firm* — Rankin, Hill & Clark LLP

(57) ABSTRACT

In an electrostatic coating apparatus, an electrically conductive coating material is supplied through a coating material supplying path to a coating gun to which a high voltage is applied. The electrostatic coating apparatus is provided with an insulating and separating valve capable of electrically insulating and separating the coating material supplying path into an application side in which the high voltage is applied and a non-application side. The insulating and separating valve is provided with a female coupling member having a first connecting portion and a male coupling member having a second connecting portion. A supplying hole for supplying a cleaning fluid to the first connecting portion and the second connecting portion and a discharging hole for discharging the cleaning fluid supplied to the first connecting portion and the second connecting portion are provided on one of the female coupling member disposed on the non-application side and the male coupling member.

3 Claims, 20 Drawing Sheets

(51) Int. Cl.
    *B05B 12/00*        (2006.01)
    *B05B 12/14*        (2006.01)
    *F16L 45/00*        (2006.01)
    *B05B 5/04*         (2006.01)
    *B05B 15/02*        (2006.01)
    *F16L 37/30*        (2006.01)

(52) U.S. Cl.
    CPC .......... *B05B 5/1666* (2013.01); *B05B 15/0258* (2013.01); *B05B 5/1625* (2013.01); *B05B 12/14* (2013.01); *B05B 12/149* (2013.01); *F16L 37/30* (2013.01); *Y10T 137/598* (2015.04)

(56) References Cited

U.S. PATENT DOCUMENTS 5,725,150 A * 3/1998 Allen et al. .................. 239/3
5,851,292 A 12/1998 Minoura et al.
6,755,913 B1 6/2004 Kobayashi et al.

FOREIGN PATENT DOCUMENTS

| | | |
|---|---|---|
| JP | 04-310267 A | 11/1992 |
| JP | 8-257443 A | 10/1996 |
| JP | 10-71347 A | 3/1998 |
| JP | 2000-233142 A | 8/2000 |
| JP | 2006-020857 A2 | 2/2006 |
| JP | 2008-509004 A | 3/2008 |
| JP | 2008-073578 A | 4/2008 |
| JP | 2008073578 A * | 4/2008 |

OTHER PUBLICATIONS

Japanese Office Action issued Jun. 18, 2013, in counterpart Japanese Patent Application No. 2009-179129 (3pp).

* cited by examiner

CONNECTING DEVICE

TECHNICAL FIELD

The present invention relates to an electrostatic coating apparatus in which a high voltage is applied to an electrically conductive coating material so as to carry out coating.

BACKGROUND ART

Conventionally, as a coating apparatus for carrying out coating over a body of a car, for example, an electrostatic coating apparatus for an electrically conductive coating material is known. In the electrostatic coating apparatus for an electrically conductive coating material, a high voltage is applied to the electrically conductive coating material supplied to a coating gun. Therefore, it is necessary to prevent a current from leaking out of a coating material supplying path for supplying the coating material to the coating gun. For this reason, an insulating and separating valve for temporarily dividing the coating material supplying path to bring an electrical insulating state is provided in the coating material supplying path (see Patent Documents 1 and 2). In other words, in electrostatic coating, the insulating and separating valve electrically insulates and separates the coating material supplying path into an application side in which a high voltage is applied and the other non-application side. Consequently, the current is prevented from leaking in the coating. On the other hand, the coating material supplying path including the insulating and separating valve is connected in the supply of the coating material to the coating gun. Thus, the coating material can be supplied.

In order to remove the coating material left in the insulating and separating valve in a proper timing between the supply of the coating material and the electrostatic coating, moreover, a cleaning fluid is supplied to the insulating and separating valve so that the insulating and separating valve is cleaned. Then, an air blow is carried out over the insulating and separating valve in order to dry the cleaning fluid.

In the conventional electrostatic coating apparatus, however, it is necessary to carefully carry out the air blow because there is a possibility that the cleaning fluid might be left on the application side. The cleaning fluid left on the application side might cause the leakage of the current in subsequent coating. Under the circumstances, therefore, plenty of time is required for the air blow.

When the coating material supplying path is to be cleaned with the cleaning fluid, moreover, a discharge or a heat generation is caused in a connecting part of the insulating and separating valve if the insulating and separating valve is connected in a state in which an electric charge is left on the application side. Therefore, there is a possibility that the connecting part might be broken, resulting in a reduction in a sealing force. For this reason, it is necessary to remove the residual electric charge from the application side of the coating material supplying path before the insulating and separating valve is connected after the electrostatic coating is carried out. In the conventional electrostatic coating apparatus, however, waiting is carried out until the residual electric charge is spontaneously discharged from the application side. Therefore, it is impossible to rapidly start the work for cleaning the coating material supplying path after performing the electrostatic coating.

In the connecting device described in Patent Document 1, moreover, the cleaning solution is supplied in the state in which the insulating and separating valve is connected. For this reason, there is a possibility that the cleaning solution cannot be supplied to the part in which the member on one of the sides of the insulating and separating valve and the member on the other side come in contact with each other and the coating material might be thus left.

On the other hand, in the connecting device described in Patent Document 2, two cylinders for generating thrusts in opposite directions to each other are used to form a clearance between the member on one of the sides of the insulating and separating valve and the member on the other side when the cleaning solution is to be supplied. More specifically, a necessary clearance for the cleaning is formed by causing both of the members to approach each other through one of the cylinders and separating them from each other through the other cylinder in the cleaning. In the connecting device, however, a pressure of the cleaning solution to be supplied to the clearance between both of the members is not considered in detail. For this reason, when the cleaning solution is supplied, the member is pushed back by the pressure of the cleaning solution so that the cleaning solution leaks. As a result, there is a possibility that a cleaning failure might be caused.

PRIOR ART DOCUMENT

Patent Document

Patent Document 1: JP-A-08-257443
Patent Document 2: JP-A-2008-73578

SUMMARY OF INVENTION

One or more embodiments of the invention provide an electrostatic coating apparatus capable of suppressing an occurrence of a current leakage in coating of an electrostatically conductive coating material, and furthermore, implementing a simplification of an air blow over an insulating and separating valve and a reduction in a time.

Moreover, one or more embodiments of the invention provide an electrostatic coating apparatus capable of cleaning, without a residual coating material, a part in which one of members of an insulating and separating valve and the other member come in contact with each other.

Furthermore, one or more embodiments of the invention provide an electrostatic coating apparatus capable of applying a high voltage to carry out electrostatic coating and then discharging an electric charge left in a coating material supplying path rapidly.

In accordance with one or more embodiments of the invention, an electrostatic coating apparatus (for instance, an electrostatic coating apparatus 1 according to a first exemplary embodiment) for an electrically conductive coating material supplies the electrically conductive coating material through a coating material supplying path (for instance, a coating material supplying path 11) to a coating gun (for instance, a coating gun 13) to which a high voltage is applied, and is provided with an insulating and separating valve (for instance, an insulating and separating valve 32) capable of electrically insulating and separating the coating material supplying path into an application side in which the high voltage is applied and the other non-application side. The insulating and separating valve is provided with a female coupling member (for instance, a female coupling member 32U) having a concave portion (for instance, a concave portion 52) serving as one of coupling portions and a first connecting portion (for instance, a connecting portion 54) provided on a bottom face (for instance, a bottom face 52a) of the concave portion and serving as a connecting portion of the coating material supplying path, and a male coupling member (for instance, a male coupling member 32D) having a convex portion (for instance, a convex portion 62) serving as the other coupling portion to be coupled to the concave portion and a second connecting portion (for instance, a connecting portion 64) provided on a tip of the convex portion and serving as a connecting portion of a passage to be connected to the first connecting portion. One of the female coupling member and the male coupling member is provided on the non-application side and includes a supplying hole (for instance, a cleaning fluid supplying hole 55a) for supplying a cleaning fluid to the first connecting portion and the second connecting portion when the first connecting portion and the second connecting portion are disposed apart from a position for a connecting state by a predetermined distance, and a discharging hole (for instance, a cleaning fluid discharging hole 56a) for discharging the cleaning fluid supplied to the first connecting portion and the second connecting portion. One of the female coupling member and the male coupling member is provided on the application side.

According to the structure, the supplying hole for supplying the cleaning fluid and the discharging hole for discharging the cleaning fluid are provided in either the female coupling member or the male coupling member which constitutes the insulating and separating value and is disposed on the non-application side. As a result, the path through which the cleaning fluid flows is formed in the coupling member on the non-application side and is not formed in the coupling member on the application side. For this reason, even if an electrically conductive cleaning fluid is left in the path on the non-application side, it is prevented from entering the application side. Accordingly, there is no possibility that a current might leak out of the coating gun. Furthermore, it is not necessary to take the leakage of the current into consideration. Consequently, it is sufficient to carry out such a simple air blow as to pull the cleaning fluid out toward the discharging side. As a result, it is also possible to reduce a time taken for the air blow.

With the structure, the male coupling member or the female coupling member may further include a seal member (for instance, a seal member 65 or a seal member 201) to be fitted in an inner peripheral surface of the concave portion in the female coupling member or an outer peripheral surface of the convex portion in the female coupling member in an outer peripheral part of the convex portion or an inner peripheral part of the concave portion. Moreover, it is also possible to further include a separating mechanism (for instance, a separating mechanism constituted by a movable member 18 and an air cylinder 19 or a separating mechanism 100) capable of moving at least one of the female coupling member and the male coupling member to be stopped in a position placed apart from a position for a connecting state of the first connecting portion and the second connecting portion by the predetermined distance (for instance, d=0.5 mm) within a range in which the seal member is fitted in the inner peripheral surface or the outer peripheral surface.

According to the structure, the seal member is provided in the male coupling member, and the insulating and separating valve can be cleaned in the state in which the first connecting portion and the second connecting portion are separated from each other by the certain distance within the range in which the seal member is fitted in the inner peripheral surface of the concave portion in the female coupling member. Consequently, it is possible to clean whole connecting surfaces of the first connecting portion and the second connecting portion. As a result, it is possible to suppress an occurrence of poor quality due to a color mixture. Moreover, it is also possible to prevent the electrically conductive coating material which is left from sticking to the application side. Therefore, there is no possibility that a current might leak out of the coating gun.

With the structure, the cleaning fluid may be deionized water.

If the deionized water is used for the cleaning fluid, it is possible to carry out the cleaning work without leaving a hard component such as calcium or magnesium.

With the structure, the male coupling member may further include a guide portion (for instance, a guide portion 61a) taking such a shape as to externally cover a part of the female coupling member on which the concave portion is formed when the first connecting portion and the second connecting portion are connected to each other.

According to the structure, it is possible to aid a maintenance of the coupling state of the female coupling member and the male coupling member through the guide portion.

According to the structure, the path through which the cleaning fluid for cleaning the insulating and separating valve flows is formed on the non-application side in the insulating and separating valve and is not formed on the application side. For this reason, even if the electrically conductive cleaning fluid is left in the path on the non-application side, it is prevented from entering the application side. Accordingly, there is no possibility that a current might leak out of the coating gun. Furthermore, it is not necessary to take the leakage of the current into consideration. Consequently, it is sufficient to carry out such a simple air blow as to pull the cleaning fluid out toward the discharging side. As a result, it is also possible to reduce a time taken for the air blow.

Further, in accordance with one or more embodiments of the invention, a connecting device (for instance, an insulating and separating valve 2032) for a fluid passage (for instance, a coating material supplying path 2022 according to a fifth exemplary embodiment) is provided with a female coupling member (for instance, a female coupling member 2032U or 2232U) having a first connecting portion (for instance, a first connecting portion 2054) on one end side thereof, and a male coupling member (for instance, a male coupling member 2032D or 2232D) having, on one end side thereof, a second connecting portion (for instance, a second connecting portion 2064) to be connected to the first connecting portion. Through the connection of the first connecting portion and the second connecting portion, a passage (for instance, a first coating material passage 2053) formed in the female coupling member is connected to a passage (for instance, a second coating material passage 2063) formed in the male coupling member. One of the female coupling member and the male coupling member includes a supplying hole (for instance, a cleaning fluid supplying hole 2055) for supplying a cleaning fluid toward the first connecting portion and the second connecting portion, and a discharging hole (for instance, a cleaning fluid discharging hole 2056) for discharging the cleaning fluid from the first connecting portion and the second connecting portion. One of the female coupling member and the male coupling member (for instance, the male coupling member 2032D) is provided with a seal member (for instance, a seal member 2066 or 2266) for closely coming in contact with the other coupling member. The connecting device includes a first operating mechanism (for instance, a main cylinder 2111) for driving at least one of the female coupling member and the male coupling member by a predetermined thrust to cause the first connecting portion and the second connecting portion to approach each other, a second operating mechanism (for instance, a cylinder 2113 for a cleaning position) for driving at least one of the female coupling member and the male coupling member by a predetermined thrust to separate the first connecting portion and the second connecting portion from each other, and a controller (for instance, a controller 2500) for controlling a thrust generated in each of the first operating mechanism and the second operating mechanism. The controller controls the thrust generated in the first operating mechanism to be greater than a force acting in such a direction as to separate the first connecting portion and the second connecting portion from each other against the thrust generated in the first operating mechanism in the supply of the cleaning fluid and to be equal to or smaller than the thrust generated in the second operating mechanism in a work for cleaning the first connecting portion and the second connecting portion with the cleaning fluid, and separates the first connecting portion and the second connecting portion from each other within a range in which the seal member closely comes in contact with the other coupling member.

According to the structure, in the case in which the passage formed in the female coupling member and the passage formed in the male coupling member are connected to form a single passage, the thrust is generated in the first operating mechanism to connect the first connecting portion and the second connecting portion to each other. In the case in which the first connecting portion and the second connecting portion are cleaned, moreover, the thrust is generated in the second operating mechanism with the thrust generated in the first operating mechanism. Thus, the first connecting portion and the second connecting portion are separated from each other within the range in which the seal member closely comes in contact with the other coupling member. By supplying the cleaning fluid from the supplying hole in this state, it is possible to clean the first connecting portion and the second connecting portion. Moreover, the cleaning fluid subjected to the cleaning work is discharged from the discharging hole. According to the structure, particularly, the thrust generated in the first operating mechanism is controlled to be greater than the force acting in such a direction as to separate the first connecting portion and the second connecting portion from each other in the supply of the cleaning fluid and to be equal to or smaller than the thrust generated in the second operating mechanism. Even if the supply of the cleaning fluid is started, consequently, it is possible to properly maintain an interval between the first connecting portion and the second connecting portion. Therefore, it is possible to clean the first connecting portion and the second connecting portion without a residue. In the case in which the connecting device is applied to the coating material supplying path of the electrostatic coating apparatus, moreover, it is possible to clean the first and second connecting portions without a residual coating material. Consequently, it is possible to prevent a leakage of a current more reliably when charging the coating gun. Accordingly, the coating material can be charged efficiently. Therefore, it is possible to enhance a coating efficiency and quality of a product.

With the structure, each of the first operating mechanism and the second operating mechanism may include an air cylinder for generating a thrust through a supply of compressed air. A cylinder diameter of the second operating mechanism may be greater than that of the first operating mechanism.

The air cylinder generates a thrust which is proportional to a square of the cylinder diameter. Therefore, the air cylinders are used as the first and second operating mechanisms and the cylinder diameter of the second operating mechanism is set to be larger than that of the first operating mechanism. Consequently, also in the case in which the first and second operating mechanisms are operated at an equal operating pressure, for instance, the thrust generated in the second operating mechanism can be greater than the thrust generated in the first operating mechanism. Accordingly, it is possible to reliably form a clearance between the first connecting portion and the second connecting portion, thereby carrying out the cleaning work.

With the structure, the cleaning fluid may be deionized water.

By using the ionized water in the cleaning work, it is possible to carry out the cleaning work without leaving a hard component such as calcium or magnesium.

Moreover, in accordance with one or more embodiments of the invention, an electrostatic coating apparatus (for instance, an electrostatic coating apparatus 3001) for an electrically conductive coating material supplies the electrically conductive coating material through a coating material supplying path (for instance, a coating material supplying path 3022) to a coating gun (for instance, a coating gun 3013) to which a high voltage is applied, and includes an insulating mechanism (for instance, an insulating and separating valve 3032) provided in the coating material supplying path for dividing the coating material supplying path into an application side which is conducted to the coating gun and a non-application side which is insulated from the coating gun, a fluid supplying path (for instance, a discharging fluid supplying path 3042) which is grounded and conducted to a part on the application side of the coating material supplying path, and a fluid supplying device (for instance, a pump of a supplying device 3043) for supplying an electrically conductive fluid to the fluid supplying path.

According to the structure, the coating material supplying path is divided into the application side which is conducted to the coating gun and in which the high voltage is applied and the non-application side which is insulated from the coating gun through the insulating mechanism. Furthermore, there are provided the fluid supplying path which is conducted to a part on the application side and is grounded and the fluid supplying device for supplying the electrically conductive fluid to the fluid supplying path. By applying the high voltage to the coating gun, consequently, it is possible to rapidly discharge an electric charge left on the application side of the coating material supplying path through the electrically conductive fluid flowing in the fluid supplying path.

With the structure, the electrically conductive fluid is supplied to the separate fluid supplying path from the coating material supplying path to discharge the residual electric charge. In addition, it is also possible to suppose that the electrically conductive fluid is supplied to the coating material supplying path, thereby discharging the residual electric charge. In this case, however, the electrically conductive fluid is caused to flow to the coating material supplying path so that a leakage or a spark might occur, resulting in a damage of the coating material supplying path. When the coating material supplying path is damaged, there is a possibility that a cleaning property of the passage might be deteriorated. In the case in which the electrically conductive fluid is caused to flow to the coating material supplying path, moreover, it is necessary to use an electrically conductive fluid which does not influence the coating material on the assumption that the electrically conductive fluid left in the passage might mix with the coating material. For instance, in some cases in which alcohol mixes with a water-based coating material, a condensation is caused. For this reason, the alcohol cannot be used as the electrically conductive fluid.

On the other hand, with the structure, the coating material supplying path is prevented from being damaged also in the case in which the electrically conductive fluid is caused to flow to the separate fluid supplying path from the coating material supplying path, resulting in an occurrence of a leakage or a spark. Therefore, it is possible to prevent the cleaning property of the coating material supplying path from being deteriorated. Also in the case in which the fluid supplying path is so damaged as to be replaced, moreover, it is possible to replace the fluid supplying path more inexpensively as compared with the case in which the coating material supplying path is replaced. Furthermore, there is no possibility that the electrically conductive fluid might mix with the coating material. Consequently, it is possible to use more fluids as the electrically conductive fluid.

With the structure, the electrostatic coating apparatus may further include a controller for controlling the fluid supplying apparatus, and the controller may start to supply the electrically conductive fluid to the fluid supplying path after the application of the high voltage to the coating gun is ended.

According to the structure, the supply of the electrically conductive fluid to the fluid supplying path is started after the application of the high voltage to the coating gun is ended. Consequently, it is possible to rapidly discharge the electric charge left on the application side of the coating material supplying path after the electrostatic coating. Therefore, in the case in which the insulating and separating valve is used as the insulating mechanism, for instance, it is possible to reduce a time taken for connecting the insulating and separating valve. Accordingly, it is possible to rapidly start the work for cleaning the coating material supplying path or the insulating and separating valve after the electrostatic coating. Therefore, it is possible to enhance a coating efficiency.

With the structure, the electrically conductive fluid may be deionized water.

For instance, in the case in which clean water is used as the electrically conductive fluid, there is a possibility that a current might leak out of the application side of the coating material supplying path through the fluid supplying path while the clean water is not supplied due to the fact that impurity contained in the clean water is left in the fluid supplying path. On the other hand, according to the embodiments, the deionized water having a smaller amount of impurity such as chlorine than the clean water is used as the electrically conductive fluid. Consequently, it is possible to reduce the amount of the impurity left in the fluid supplying path. Therefore, it is possible to prevent the current from leaking out of the coating material supplying path while the electrically conductive fluid is not supplied.

With the structure, the electrostatic coating apparatus may further include a gas supplying device (for instance, an air compressor of a supplying device 3043 which will be described below) for supplying a gas to the fluid supplying path.

According to the structure, there is provided the gas supplying device for supplying a gas to the fluid supplying path. For instance, consequently, it is possible to discharge the electrically conductive fluid left in the fluid supplying path by supplying the electrically conductive fluid to the fluid supplying path to discharge a residual electric charge from the application side of the coating material supplying path and then supplying a gas to the fluid supplying path. Thus, it is possible to prevent the current from leaking out of the application side of the coating material supplying path through the fluid supplying path while the electrically conductive fluid is not supplied.

Other aspects and advantages of the invention will be apparent from the following description and the appended claims.

DESCRIPTION OF EMBODIMENTS

Exemplary embodiments according to the invention will be described below with reference to the drawings.

First Exemplary Embodiment

Figure 1:
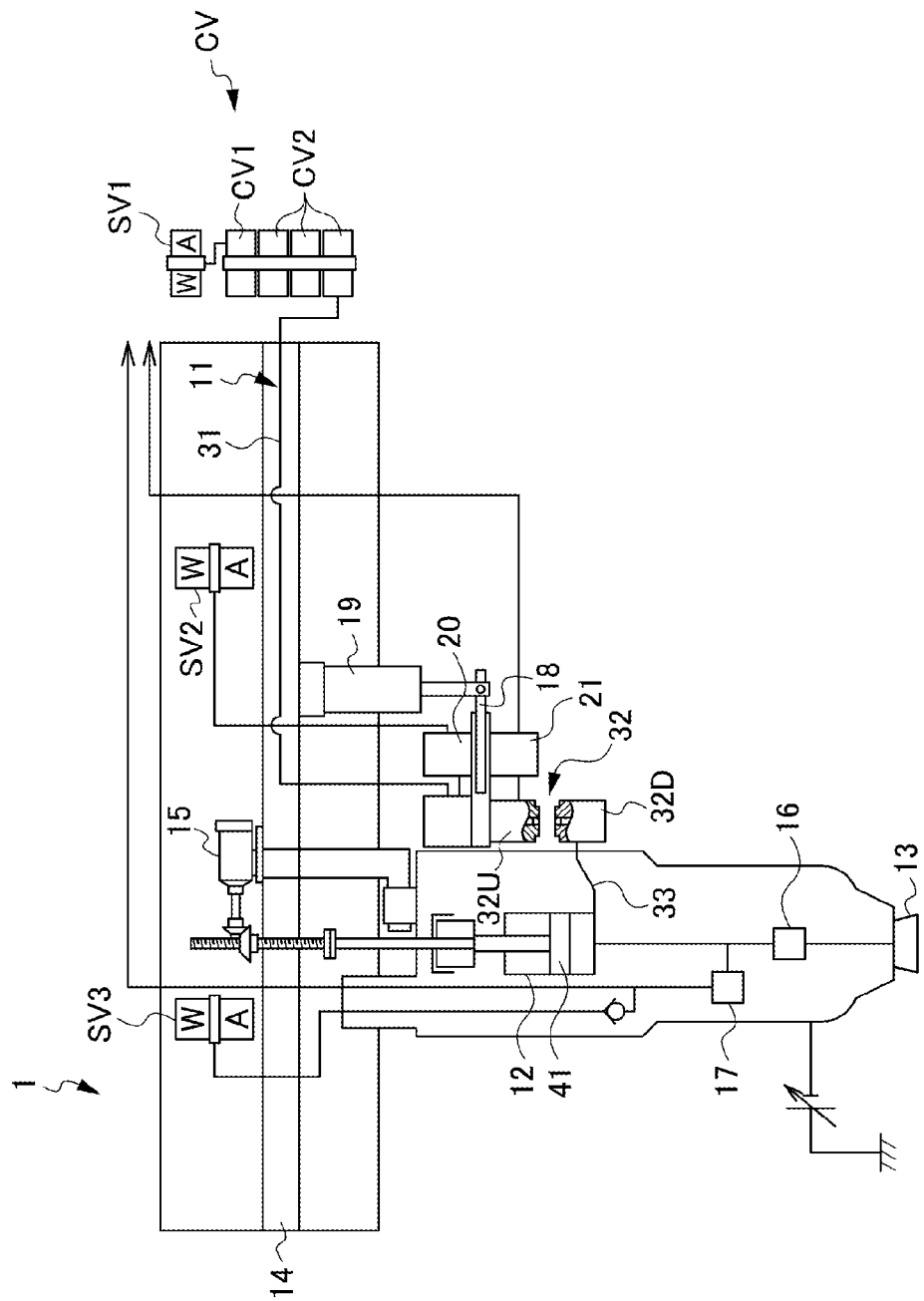
FIG. 1 is a typical view showing a schematic structure of an electrostatic coating apparatus according to a first exemplary embodiment.

FIG. 1 is a typical view showing a schematic structure of an electrostatic coating apparatus 1 according to a first embodiment of the invention. The electrostatic coating apparatus 1 serves to carry out electrostatic coating over an object to be coated. It is possible to employ, as the object to be coated, a body of a car, for instance.

The electrostatic coating apparatus 1 includes a coating material supplying path 11, an intermediate reservoir 12, a bell type coating gun 13, a ram 14, a servomotor 15, a trigger valve 16, a dump valve 17, a movable member 18, an air cylinder 19, a cleaning fluid supply switching valve 20, and a cleaning fluid discharge switching valve 21.

A color change valve CV includes valves CV1 and CV2. A valve SV1 linked to the valve CV1 controls a supply of air (A) and a cleaning fluid (W) which are to be used in a color change. The valve CV1 controls a supply of the air or the cleaning fluid from the valve SV1. The valve CV2 is connected to a plurality of coating material tanks (not shown) respectively and controls a supply of an electrically conductive coating material (hereinafter referred to as a coating material) from a fuel tank which is connected. In response to a control signal sent from a controller which is not shown, each of the valves SV1, CV1 and CV2 is controlled to be opened/closed and the coating material, the air or the cleaning fluid which is intended is compression transported to the coating material supplying path 11.

For instance, the coating material stored in a predetermined coating material tank is compression transported to the coating material supplying path 11 through the color change valve CV. Furthermore, the coating material is compression transported to the intermediate reservoir 12 through the coating material supplying path 11 and is stored therein. The coating material stored in the intermediate reservoir 12 is supplied to a tip of the coating gun 13 through the trigger valve 16. The coating gun 13 sprays the coating material from the tip. In detail, the coating material is supplied to the coating gun 13 in a state in which a high voltage is applied. Consequently, the electrostatic coating apparatus 1 can carry out electrostatic coating by charging and atomizing the coating material and spraying the coating material from the tip of the coating gun 13. The coating gun 13 is fixed to the ram 14 which can be reciprocated vertically and transversely. By reciprocating the ram 14 vertically and transversely depending on a shape of an object to be coated, accordingly, it is possible to maintain an almost constant clearance between the tip of the coating gun 13 and the object to be coated.

The coating material supplying path 11 is provided with a coating material hose 31, an insulating and separating valve 32, and a coating material hose 33. The insulating and separating valve 32 includes a female coupling member 32U fixed to the movable member 18 and a male coupling member 32D fixed to the coating gun 13. The movable member 18 is vertically moved by means of the air cylinder 19 fixed to the ram 14. When the movable member 18 is moved downward, accordingly, the female coupling member 32U is bonded to the male coupling member 32D. When the movable member 18 is moved upward, moreover, the female coupling member 32U is separated from the male coupling member 32D.

The servomotor 15 precisely controls a position of a piston 41 provided on the intermediate reservoir 12. When the piston 41 is moved forward by the control of the servomotor 15, that is, is moved in such a direction as to approach the tip of the coating gun 13 in FIG. 1, the coating material stored in the intermediate reservoir 12 is compression transported to the coating gun 13 through the trigger valve 16. When the piston 41 is moved backward by the control of the servomotor 15, that is, is moved in such a direction as to separate from the tip of the coating gun 13 in FIG. 1, furthermore, the coating material is sucked from the insulating and separating valve 32 through the coating material hose 33 and is thus stored in the intermediate reservoir 12.

The trigger valve 16 controls the supply of the coating material from the intermediate reservoir 12 to the coating gun 13. The dump valve 17 controls a discharge of a waste liquid of the coating material in the color change. A cleaning valve SV3 controls the supply of the air (A) and the cleaning fluid (W) which are to be used in cleaning of the coating gun 13. Each of the trigger valve 16, the dump valve 17 and the cleaning valve SV3 is controlled to be opened/closed in response to a control signal sent from the controller which is not shown.

A cleaning valve SV2 controls the supply of the air (A) and the cleaning fluid (W) which are to be used in cleaning of the insulating and separating valve 32. The cleaning fluid supply switching valve 20 controls the supply of the air or the cleaning fluid from the cleaning valve SV2 to the female coupling member 32U. The cleaning fluid discharge switching valve 21 controls the discharge of the air or the cleaning fluid from the female coupling member 32U. Each of the cleaning valve SV2, the cleaning fluid supply switching valve 20 and the cleaning fluid discharge switching valve 21 is controlled to be opened/closed in response to a control signal sent from the controller which is not shown. Consequently, the cleaning fluid or the air is transmitted in order of the cleaning valve SV2, the cleaning fluid supply switching valve 20, the female coupling member 32U of the insulating and separating valve 32 and the cleaning fluid discharge switching valve 21.

Figure 2:
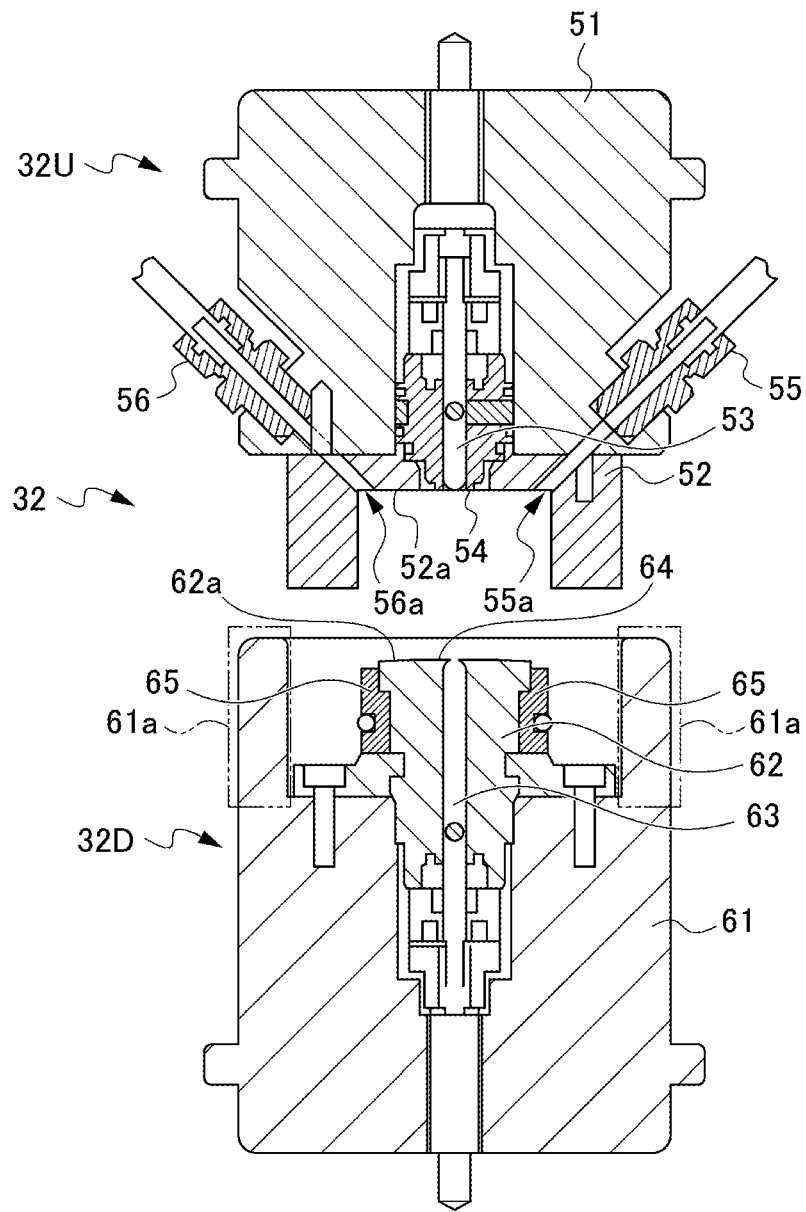
FIG. 2 is a longitudinal sectional view showing a structure of an insulating and separating valve in the electrostatic coating apparatus according to the first exemplary embodiment.

FIG. 2 is a longitudinal sectional view showing a structure of the insulating and separating valve 32 in the electrostatic coating apparatus 1. Referring to each member constituting the insulating and separating valve 32, an end on a side where the female coupling member 32U and the male coupling member 32D are coupled to each other will be referred to as a tip, and an end on an opposite side thereto will be referred to as a base end.

The female coupling member 32U of the insulating and separating valve 32 includes a valve body 51, a concave portion 52, a coating material supplying passage 53, a connecting portion 54, a cleaning fluid supplying member 55, and a cleaning fluid discharging member 56.

The concave portion 52 is provided on a tip of the valve body 51 fixed to the movable member 18 (FIG. 1). The concave portion 52 functions as a coupling portion to be coupled to a convex portion 62 of the male coupling member 32D. The coating material supplying passage 53 is formed to penetrate from a central inner part of the valve body 51 to a bottom face 52a of the concave portion 52. The connecting portion 54 provided on the bottom face 52a of the concave portion 52 is engaged with a connecting portion 64 of the male coupling member 32D when the concave portion 52 and the convex portion 62 are coupled to each other. As a result, the coating material supplying passage 53 is connected to a coating material supplying passage 63 of the male coupling member 32D. The cleaning fluid supplying member 55 is provided on a right side surface of FIG. 2 in the valve body 51. A cleaning fluid supplying hole 55a is formed to penetrate from a central inner part of the cleaning fluid supplying member 55 to the bottom face 52a of the concave portion 52. Moreover, the cleaning fluid discharging member 56 is provided on a left side surface of FIG. 2 in the valve body 51. A cleaning fluid discharging hole 56a is formed to penetrate from a central inner part of the cleaning fluid discharging member 56 to the bottom face 52a of the concave portion 52. Accordingly, the air or the cleaning fluid which is sent from the cleaning fluid supply switching valve 20 (FIG. 1) is supplied to the insulating and separating valve 32 through the cleaning fluid supplying hole 55a. Furthermore, the supplied air or cleaning fluid is discharged to the cleaning fluid discharge switching valve 21 (FIG. 1) through the cleaning fluid discharging hole 56a.

On the other hand, the male coupling member 32D of the insulating and separating valve 32 includes a valve body 61, the convex portion 62, the coating material supplying passage 63, the connecting portion 64 and a seal member 65.

The convex portion 62 is provided on a tip of the valve body 61 fixed to the coating gun 13 (FIG. 1). The convex portion 62 functions as a coupling portion to be coupled to the concave portion 52 of the female coupling member 32U. The coating material supplying passage 63 is formed to penetrate from a central inner part of the valve body 61 to an upper surface 62a of the convex portion 62. A region of the upper surface 62a of the convex portion 62 which is engaged with the connecting portion 54 of the female coupling member 32U in the coupling of the concave portion 52 to the convex portion 62 is provided as the connecting portion 64. Although the connecting portion 64 is thus formed as a partial region of the upper surface 62a of the convex portion 62 in the embodiment, it is also possible to constitute the connecting portion 64 by a member which is independent of the convex portion 62. The connecting portion 64 is engaged with the connecting portion 54 of the female coupling member 32U to connect the coating material supplying passage 63 to the coating material supplying passage 53 of the female coupling member 32U. The seal member 65 is provided on an outer peripheral part of the convex portion 62 in such a manner that it is fitted in an inner peripheral surface of the concave portion 52 with the connecting portions 54 and 64 separated from each other by a certain distance.

A guide portion 61a formed on a tip of the valve body 61 takes such a shape as to externally cover a part in which the concave portion 52 is formed when the concave portion 52 and the convex portion 62 are coupled to each other, that is, the connecting portions 54 and 64 are connected to each other. Consequently, it is possible to aid a maintenance of the coupling state of the female coupling member 32U and the male coupling member 32D.

Figure 3:
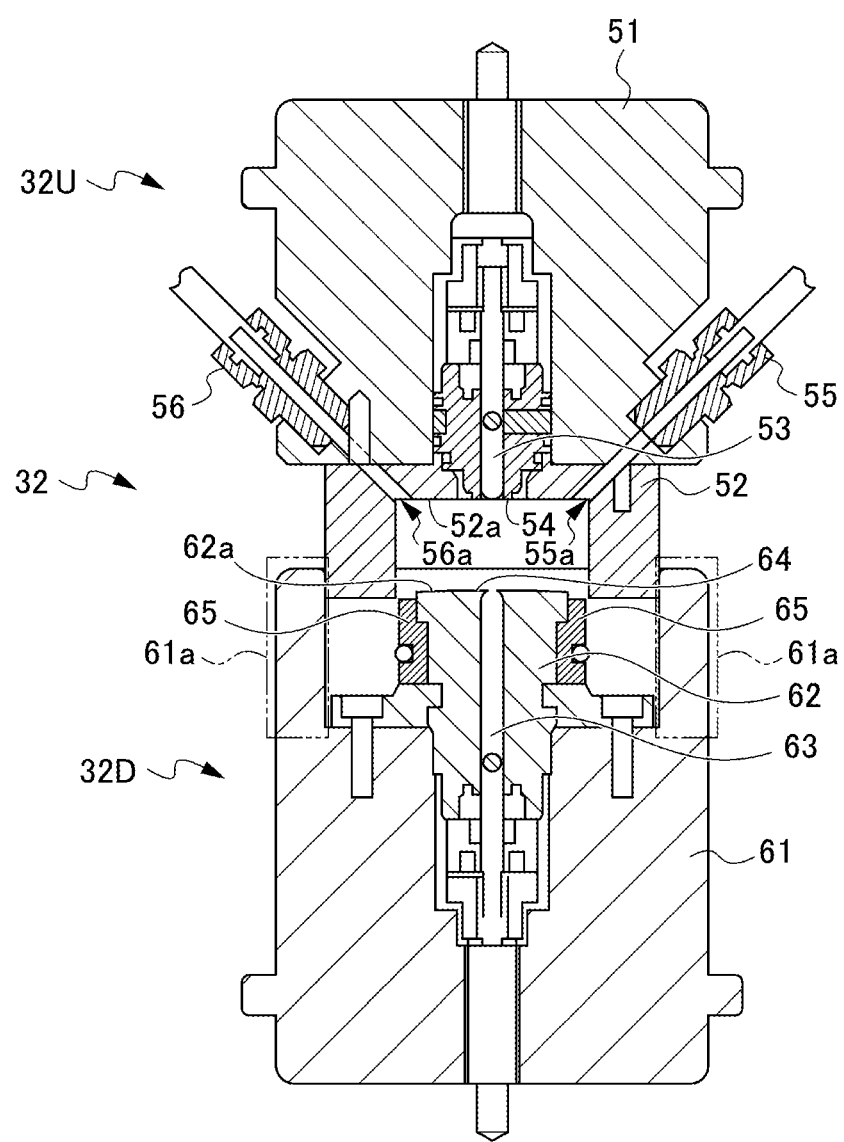
FIG. 3 is a longitudinal sectional view showing the structure of the insulating and separating valve in the electrostatic coating apparatus according to the first exemplary embodiment.
Figure 4:
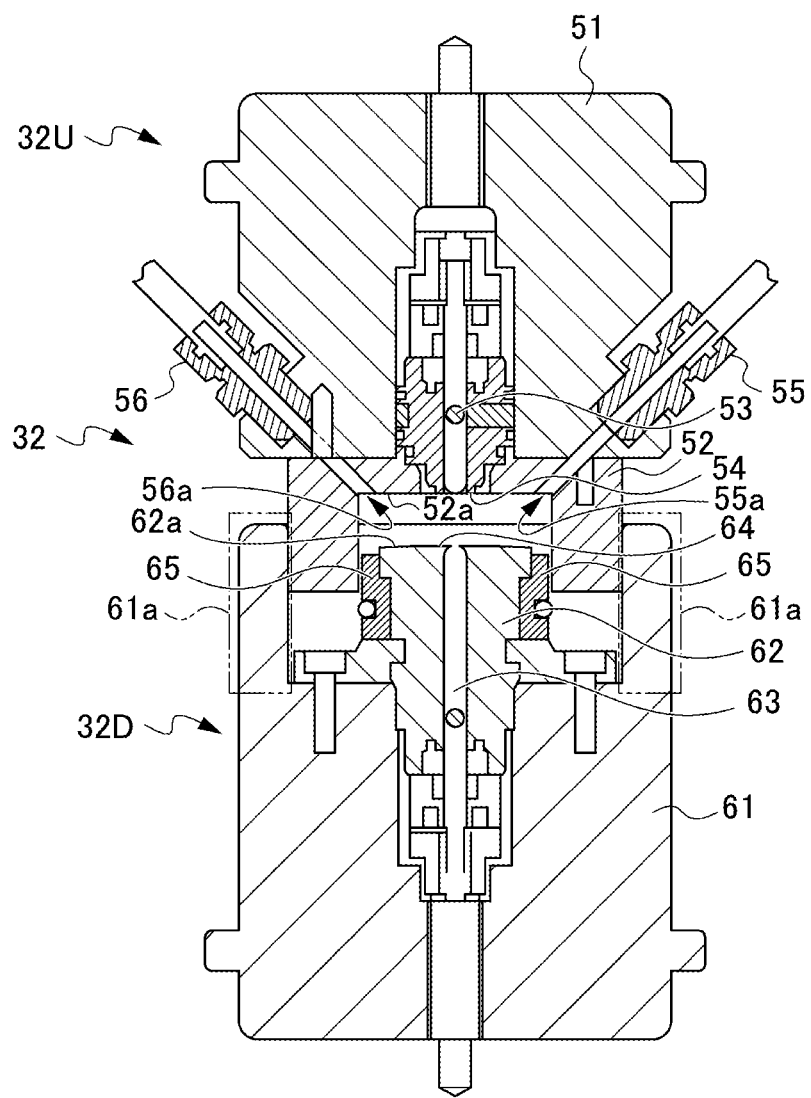
FIG. 4 is a longitudinal sectional view showing the structure of the insulating and separating valve in the electrostatic coating apparatus according to the first exemplary embodiment.
Figure 5:
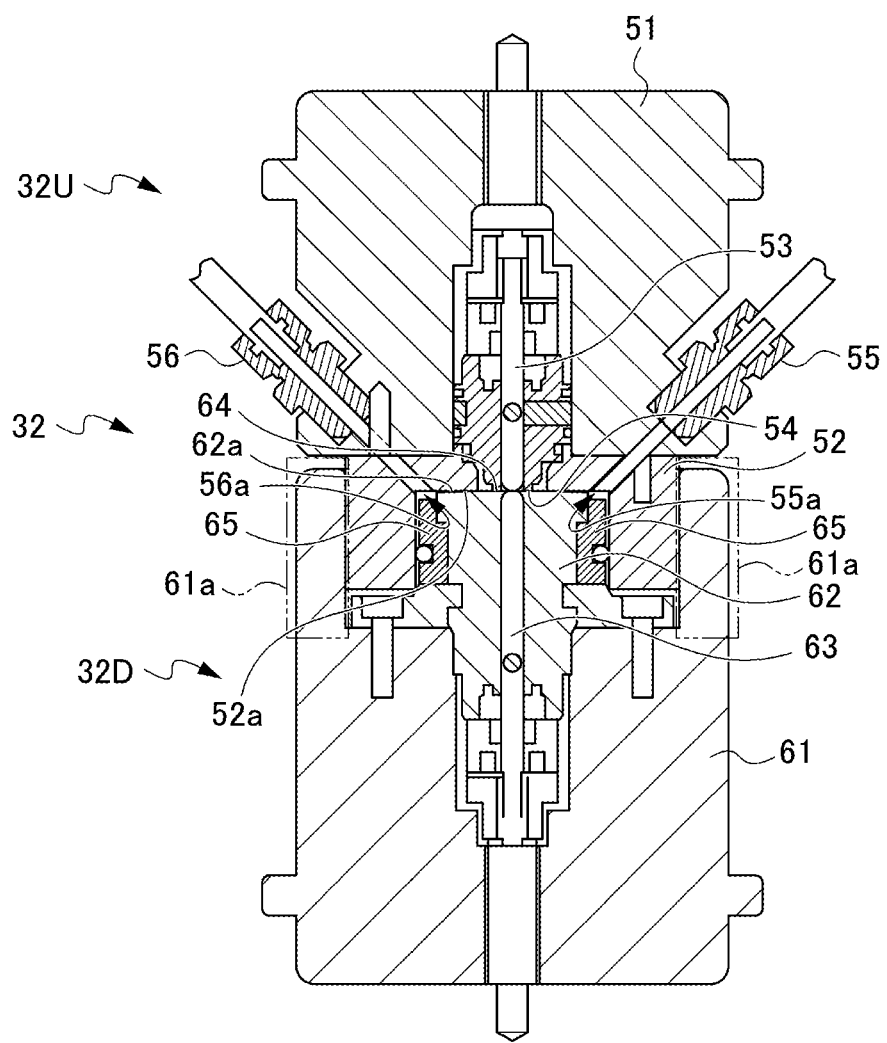
FIG. 5 is a longitudinal sectional view showing the structure of the insulating and separating valve in the electrostatic coating apparatus according to the first exemplary embodiment.

Next, an operation of the electrostatic coating apparatus 1 according to the first exemplary embodiment will be described. In particular, an operation around the insulating and separating valve 32 will be described with reference to FIGS. 2 to 5. FIGS. 3 to 5 are longitudinal sectional views showing a structure of the insulating and separating valve 32 in the electrostatic coating apparatus 1 in the same manner as FIG. 2. In FIGS. 2 to 5, the female coupling member 32U is disposed in different positions from each other. The reason is that FIGS. 2 to 5 show a state in which the female coupling member 32U gradually approaches the male coupling member 32D in order.

Prior to the electrostatic coating, first of all, the coating material is supplied to the intermediate reservoir 12 and is stored therein. More specifically, when the movable member 18 is moved downward by means of the air cylinder 19, the female coupling member 32U of the insulating and separating valve 32 is moved downward to approach the male coupling member 32D as shown in order of FIGS. 2 to 4. As shown in FIG. 5, finally, the female coupling member 32U is bonded to the male coupling member 32D. In other words, the concave portion 52 of the female coupling member 32U is coupled to the convex portion 62 of the male coupling member 32D. As a result, the connecting portion 54 of the female coupling member 32U is engaged with the connecting portion 64 of the male coupling member 32D. Consequently, the coating material supplying passage 53 of the female coupling member 32U is connected to the coating material supplying passage 63 of the male coupling member 32D. In other words, there is connected the coating material supplying path 11 for a linkage from the color change valve CV to the intermediate reservoir 12. When an intended coating material is selected by the color change valve CV in this state, the coating material thus selected is compression transported to the intermediate reservoir 12 via the coating material hose 31, the insulating and separating valve 32 and the coating material hose 33, and is stored therein.

When the coating material is stored in a predetermined amount in the intermediate reservoir 12, the movable member 18 is moved upward by means of the air cylinder 19 so that the female coupling member 32U of the insulating and separating valve 32 is moved upward until the state of FIG. 4 is brought. The state of FIG. 4 represents that the connecting portion 54 of the female coupling member 32U and the connecting portion 64 of the male coupling member 32D are separated from each other by a predetermined distance (for instance, 0.5 mm) within a range in which the seal member 65 of the male coupling member 32D is fitted in the inner peripheral surface of the concave portion 52 in the female coupling member 32U.

In the state of FIG. 4, the coating material is left in a space surrounded by the concave portion 52 of the female coupling member 32U and the convex portion 62 of the male coupling member 32D (which will be hereinafter referred to as a cleaning space) in some cases. In order to remove the coating material, therefore, an inner part of the cleaning space is cleaned in the following manner. In other words, the cleaning fluid (W) is supplied from the cleaning valve SV2 to the female coupling member 32U of the insulating and separating valve 32 through the cleaning fluid supply switching valve 20. The cleaning fluid is supplied to the cleaning space through the cleaning fluid supplying hole 55a and is utilized for cleaning the inner part of the cleaning space. In the exemplary embodiment, thus, the cleaning work is carried out with the connecting portion 54 of the female coupling member 32U and the connecting portion 64 of the male coupling member 32D separated from each other by a predetermined distance (for instance, 0.5 mm). Therefore, the connecting portions 54 and 64 can be cleaned wholly. As a result, the coating material is also removed almost wholly. Even if a color change is then carried out, therefore, it is possible to prevent low quality from being caused by a color mixture. The cleaning fluid used in the cleaning work is discharged to the cleaning fluid discharge switching valve 21 through the cleaning fluid discharging hole 56a of the female coupling member 32U together with the coating material left in the cleaning space.

A type of the cleaning fluid for cleaning the insulating and separating valve 32 is not particularly restricted. In the exemplary embodiment, for instance, deionized water is employed for the cleaning fluid. It is possible to carry out the cleaning work without causing a hard component such as calcium or magnesium to be left. Thus, a sealing property of the seal member 65 can be maintained. To the contrary, hard water is not suitable for the cleaning fluid because the hard component is apt to be left after drying so that there is a fear that the sealing property might be deteriorated.

When the insulating and separating valve 32 is completely cleaned, an air blow is carried out to dry the cleaning fluid. In other words, in the state of FIG. 4, the air (A) is supplied from the cleaning valve SV2 to the female coupling member 32U of the insulating and separating valve 32 through the cleaning fluid supply switching valve 20. The air is supplied into the cleaning space through the cleaning fluid supplying hole 55*a* and is discharged to the cleaning fluid discharge switching valve 21 through the cleaning fluid discharging hole 56*a* of the female coupling member 32U.

When the air blow is ended, the insulating and separating valve 32 electrically insulates and separates the coating material supplying path 11 into the application side and the non-application side as a pretreatment for the electrostatic coating. More specifically, when the movable member 18 is moved upward by means of the air cylinder 19, the female coupling member 32U of the insulating and separating valve 32 is upward moved apart from the male coupling member 32D as shown in order of FIGS. 4, 3 and 2. As shown in FIG. 2, finally, the female coupling member 32U and the male coupling member 32D are held with the connecting portion 54 of the female coupling member 32U and the connecting portion 64 of the male coupling member 32D separated from each other by a certain distance (for instance, 180 mm or more). Consequently, an electrical insulation can be maintained.

In a state in which the electrical insulation is thus maintained, the electrostatic coating is carried out. In other words, a voltage of a power supply is raised so that a high voltage is applied to the coating gun 13. Then, the coating material is supplied from the intermediate reservoir 12 to the tip of the coating gun 13 through the trigger valve 16. Consequently, the coating material is charged by the application of the high voltage and is thus sprayed from the tip of the coating gun 13. Thus, the electrostatic coating is carried out.

The high voltage is applied to the male coupling member 32D of the insulating and separating valve 32 and is not applied to the female coupling member 32U maintaining the electrical insulation while the electrostatic coating is carried out. In other words, in the exemplary embodiment, the male coupling member 32D is provided on the application side and the female coupling member 32U is provided on the non-application side. A path through which the cleaning fluid flows (which will be hereinafter referred to as a cleaning path) is formed in the female coupling member 32U on the non-application side and is not formed in the male coupling member 32D on the application side as described above. For this reason, even if an electrically conductive cleaning fluid is left in the cleaning path on the non-application side, it does not enter the application side. Accordingly, there is no possibility that a current might leak out of the coating gun 13. In the embodiment, thus, it is not necessary to take the leakage of the current into consideration. Therefore, it is sufficient to carry out such a simple air blow as to push the cleaning fluid out toward the discharging side (the cleaning fluid discharge switching valve 21 side in the example of FIG. 1). As a result, a time taken for the air blow is reduced. The air blow to push the cleaning fluid out toward the discharging side is required for the following reason. More specifically, if such push-out is not carried out, there is a possibility that the cleaning fluid might be brought back to stick to the male coupling member 32D on the application side when the female coupling member 32U is separated from the male coupling member 32D in order to perform an electrical insulation. In other words, when the electrostatic coating is carried out in this state, there is a possibility that a current might leak due to the cleaning fluid sticking to the male coupling member 32D.

The electrostatic coating apparatus 1 according to the first exemplary embodiment has been described as the electrostatic coating apparatus to which the invention is applied. However, the invention is not restricted to the first exemplary embodiment but various embodiments can be employed.

For instance, in the first exemplary embodiment, the separating mechanism including the movable member 18 and the air cylinder 19 is employed as the separating mechanism for separating the female coupling member 32U and the male coupling member 32D in the insulating and separating valve 32 from each other. However, the structure of the separating mechanism is not particularly restricted to the structure according to the first exemplary embodiment but it is sufficient to employ a structure in which the female coupling member 32U and the male coupling member 32D are held in the following first to third positions, respectively. The first position is taken when the coating material is supplied to the intermediate reservoir 12. In the first position, the convex portion 62 of the male coupling member 32D is coupled to the concave portion 52 of the female coupling member 32U. The first position will be hereinafter referred to as a coupling position. For instance, in the first exemplary embodiment, FIG. 5 shows a state in which the female coupling member 32U and the male coupling member 32D are held in the coupling position. The second position is taken when the insulating and separating valve 32 is cleaned. In the second position, the connecting portion 54 of the female coupling member 32U is separated from the connecting portion 64 of the male coupling member 32D by a predetermined distance (for instance, 0.05 mm) in a state in which the seal member 65 of the male coupling member 32D is fitted in the inner peripheral surface of the concave portion 52 in the female coupling member 32U. The second position will be hereinafter referred to as a cleaning position. For instance, in the first exemplary embodiment, FIG. 4 shows a state in which the female coupling member 32U and the male coupling member 32D are held in the cleaning position. The third position is taken when the electrostatic coating is carried out. In the third position, a distance between the connecting portion 54 of the female coupling member 32U and the connecting portion 64 of the male coupling member 32D is set to be a predetermined distance (for instance, 180 mm or more) at which an electrical insulation can be held with a high voltage applied to the coating gun 13. The third position will be hereinafter referred to as a separating position. For instance, in the first exemplary embodiment, FIG. 2 shows a state in which the female coupling member 32U and the male coupling member 32D are held in the separating position.

Second Exemplary Embodiment

Figure 6:
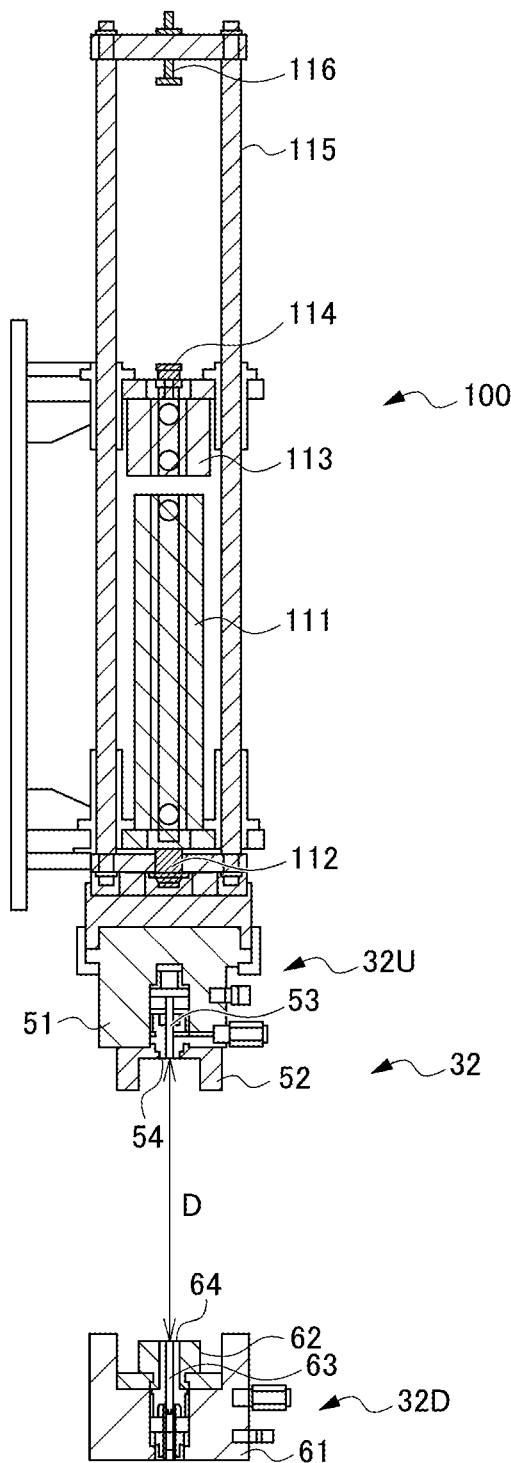
FIG. 6 is a longitudinal sectional view showing a schematic structure of a periphery of a separating mechanism and an insulating and separating valve in an electrostatic coating apparatus according to a second exemplary embodiment.
Figure 7:
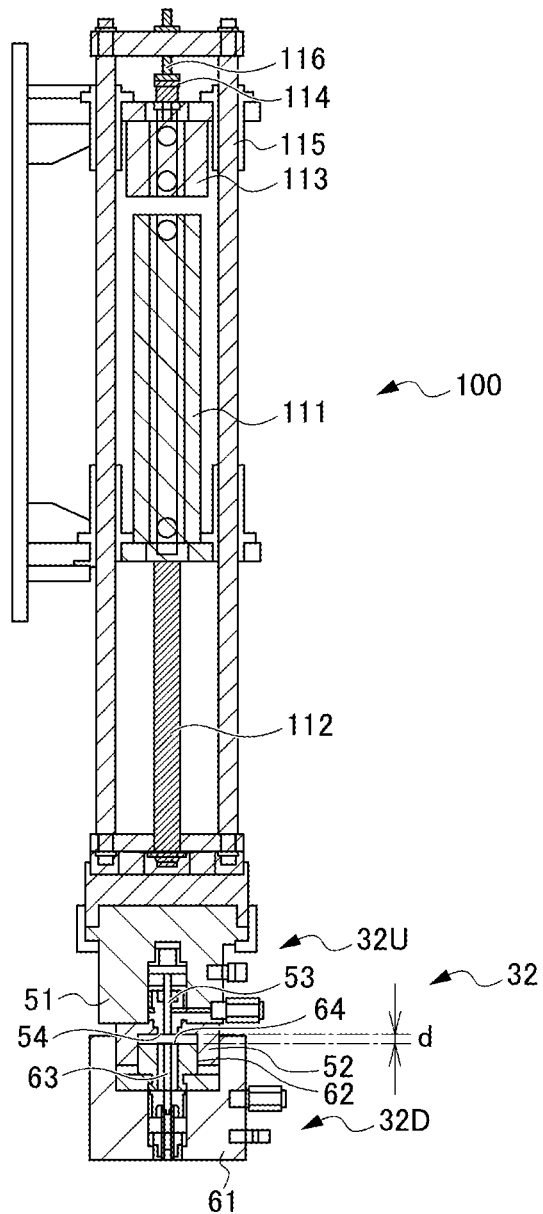
FIG. 7 is a longitudinal sectional view showing the schematic structure of the periphery of the separating mechanism and the insulating and separating valve in the electrostatic coating apparatus according to the second exemplary embodiment.
Figure 8:
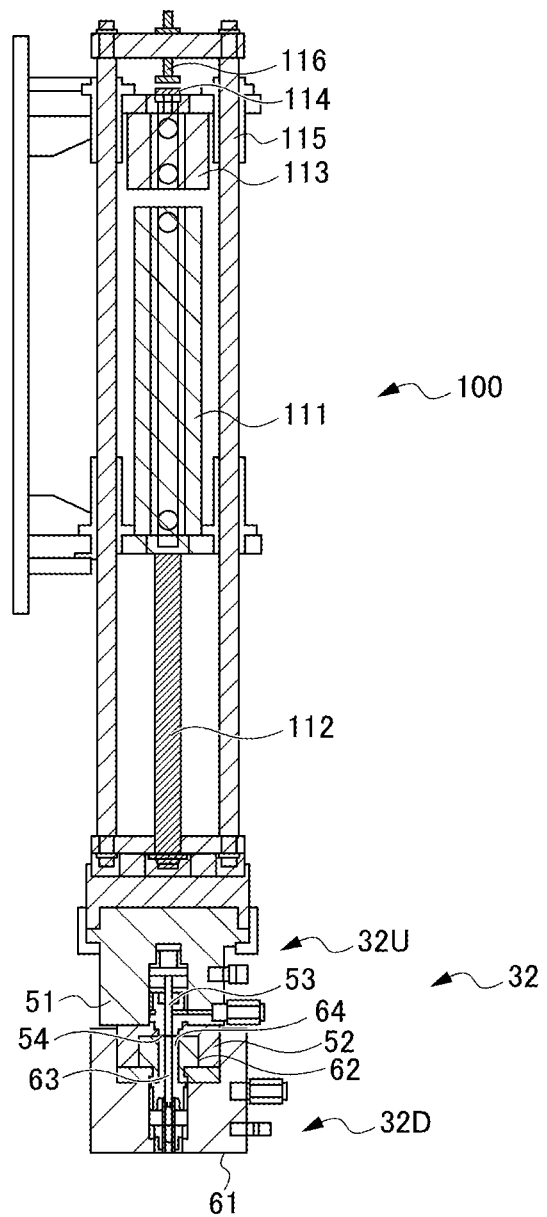
FIG. 8 is a longitudinal sectional view showing the schematic structure of the periphery of the separating mechanism and the insulating and separating valve in the electrostatic coating apparatus according to the second exemplary embodiment.

An embodiment including a different separating mechanism from that of the first exemplary embodiment will be described below as a second exemplary embodiment according to the invention. FIGS. 6 to 8 are longitudinal sectional views showing a schematic structure of a periphery of a separating mechanism 100 and an insulating and separating valve 32 in an electrostatic coating apparatus according to the second exemplary embodiment of the invention. FIG. 6 shows a state in which a female coupling member 32U and a male coupling member 32D in the insulating and separating valve 32 are held in a separating position. FIG. 7 shows a state in which the female coupling member 32U and the male coupling member 32D are held in a cleaning position. FIG. 8 shows a state in which the female coupling member 32U and the male coupling member 32D are held in a coupling position.

In FIGS. 6 to 8, corresponding portions to those in FIGS. 1 to 5 have the same reference numerals and their description will be properly omitted. A direction of a viewpoint in FIGS. 6 to 8 is different from that in FIGS. 2 to 5. For this reason, a cleaning fluid supplying member 55 and a cleaning fluid discharging member 56 are not shown in FIGS. 6 to 8. The female coupling member 32U according to the second embodiment is also provided with the cleaning fluid supplying member 55 and the cleaning fluid discharging member 56 respectively in the same manner as in the first exemplary embodiment.

The separating mechanism 100 includes a main cylinder 111, a main rod 112, a cylinder 113 for a cleaning position, a rod 114 for a cleaning position, a movable housing 115, and a stopper 116. The main cylinder 111 is provided in the movable housing 115 in a vertical direction. The main rod 112 is stored in the main cylinder 111 to be longitudinally movable. A backward moving direction of the main rod 112 (a direction of storage in the main cylinder 111) is set to be an upward direction. The cylinder 113 for a cleaning position is provided above the main cylinder 111 in the movable housing 115. The rod 114 for a cleaning position is stored in the cylinder 113 for a cleaning position so as to be longitudinally movable. A backward moving direction of the rod 114 for a cleaning position (a direction of storage in the cylinder 113 for a cleaning position) is set to be a downward direction. The main rod 112 and the insulating and separating valve 32 are fixed to a bottom part of the movable housing 115 respectively in such a manner that they are opposed to each other. Interlockingly with a longitudinal moving operation of the main rod 112 through the main cylinder 111, accordingly, the movable housing 115 and the female coupling member 32U are also moved vertically.

The stopper 116 is disposed opposite to the rod 114 for a cleaning position in an upper part of the movable housing 115. The stopper 116 controls a downward movement of the movable housing 115 when it is engaged with the rod 114 for a cleaning position. In other words, when the rod 114 for a cleaning position is moved forward (upward) by the cylinder 113 for a cleaning position in a state in which the stopper 116 is engaged with the rod 114 for a cleaning position, the stopper 116 is upward moved interlockingly therewith. As a result, the movable housing 115 is also moved upward.

Since the other structures of the electrostatic coating apparatus according to the second exemplary embodiment are basically the same as the structure of the electrostatic coating apparatus 1 according to the first exemplary embodiment in FIG. 1, illustration is omitted. Therefore, the description will be omitted.

Next, an operation of the electrostatic coating apparatus according to the second exemplary embodiment will be described. Referring to the operation of the electrostatic coating apparatus according to the second exemplary embodiment, only operations of the insulating and separating valve 32 and the separating mechanism 100 are different and the other operations are coincident as compared with the operation of the electrostatic coating apparatus 1 according to the first exemplary embodiment. Therefore, only the operations of the insulating and separating valve 32 and the separating mechanism 100 will be described below.

First of all, in the case in which a coating material is supplied to an intermediate reservoir 12 and is stored therein, the main rod 112 is moved forward (downward) by means of the main cylinder 111 so that the movable housing 115 and the female coupling member 32U are correspondingly moved downward to approach the male coupling member 32D. At this time, the rod 114 for a cleaning position is stored in the cylinder 113 for a cleaning position so as not to come in contact with the stopper 116. Finally, a concave portion 52 of the female coupling member 32U and a convex portion 62 of the male coupling member 32D are coupled to each other so that the downward movement of the movable housing 115 and the female coupling member 32U is stopped. Consequently, the female coupling member 32U and the male coupling member 32D are held in the coupling position as shown in FIG. 8.

When the coating material is stored in a predetermined amount in the intermediate reservoir 12, then, the rod 114 for a cleaning position is moved forward (upward) by means of the cylinder 113 for a cleaning position. When the rod 114 for a cleaning position is moved forward (upward) to some degree, the stopper 116 is engaged with the rod 114 for a cleaning position. When the rod 114 for a cleaning position is subsequently moved forward (upward), accordingly, the movable housing 115 to which the stopper 116 is fixed and the female coupling member 32U are interlockingly moved upward. When the rod 114 for a cleaning position is then moved forward (upward) to a stroke end and is stopped, the movable housing 115 and the female coupling member 32U are also stopped.

It is assumed that a position of installation of the cylinder 113 for a cleaning position and the stroke end of the rod 114 for a cleaning position are regulated in such a manner that a connecting portion 54 of the female coupling member 32U and a connecting portion 64 of the male coupling member 32D are separated from each other by a predetermined distance d (for instance, d=0.5 mm) in the case in which the rod 114 for a cleaning position is moved forward (upward) to the stroke end and is then stopped. When the regulation is carried out, the insulating and separating valve 32 can be cleaned with the female coupling member 32U and the male coupling member 32D held in a position in which the connecting portion 54 of the female coupling member 32U and the connecting portion 64 of the male coupling member 32D are separated from each other by the predetermined distance d (for instance, d=0.5 mm), that is, the cleaning position as shown in FIG. 7. In the same manner as the case according to the first exemplary embodiment, consequently, the connecting portion 54 of the female coupling member 32U and the connecting portion 64 of the male coupling member 32D can be cleaned wholly. As a result, the residual coating material is eliminated almost entirely. Even if a color change is then carried out, therefore, it is possible to prevent poor quality from being caused by a color mixture. In the second exemplary embodiment, furthermore, the cylinder 113 for a cleaning position and the rod 114 for a cleaning position are used in addition to the main cylinder 111 and the main rod 112. Consequently, it is possible to further reliably hold, in the cleaning position, a position in which the female coupling member 32U and the male coupling member 32D are disposed during the cleaning work.

When the work for cleaning the insulating and separating valve 32 is completed and a subsequent air blow is also terminated, the main rod 112 is moved backward (upward) by means of the main cylinder 111 so that the movable housing 115 and the female coupling member 32U are upward moved apart from the male coupling member 32D. When the main rod 112 is moved backward (upward) to the end and is thus stopped, finally, the upward movement of the movable housing 115 and the female coupling member 32U is also stopped. As shown in FIG. 6, consequently, the female coupling member 32U and the male coupling member 32D are held in the separating position. In other words, the connecting portion 54 of the female coupling member 32U and the connecting portion 64 of the male coupling member 32D are held apart from each other by a certain distance D (for instance, D=180 mm or more). Consequently, an electrical insulation can be maintained. In the same manner as in the first exemplary embodiment, thereafter, electrostatic coating is carried out with the electrical insulation maintained.

Third Exemplary Embodiment

Next, an embodiment including a different insulating and separating valve from that in each of the first and second exemplary embodiments will be described as a third exemplary embodiment according to the invention.

Figure 9:
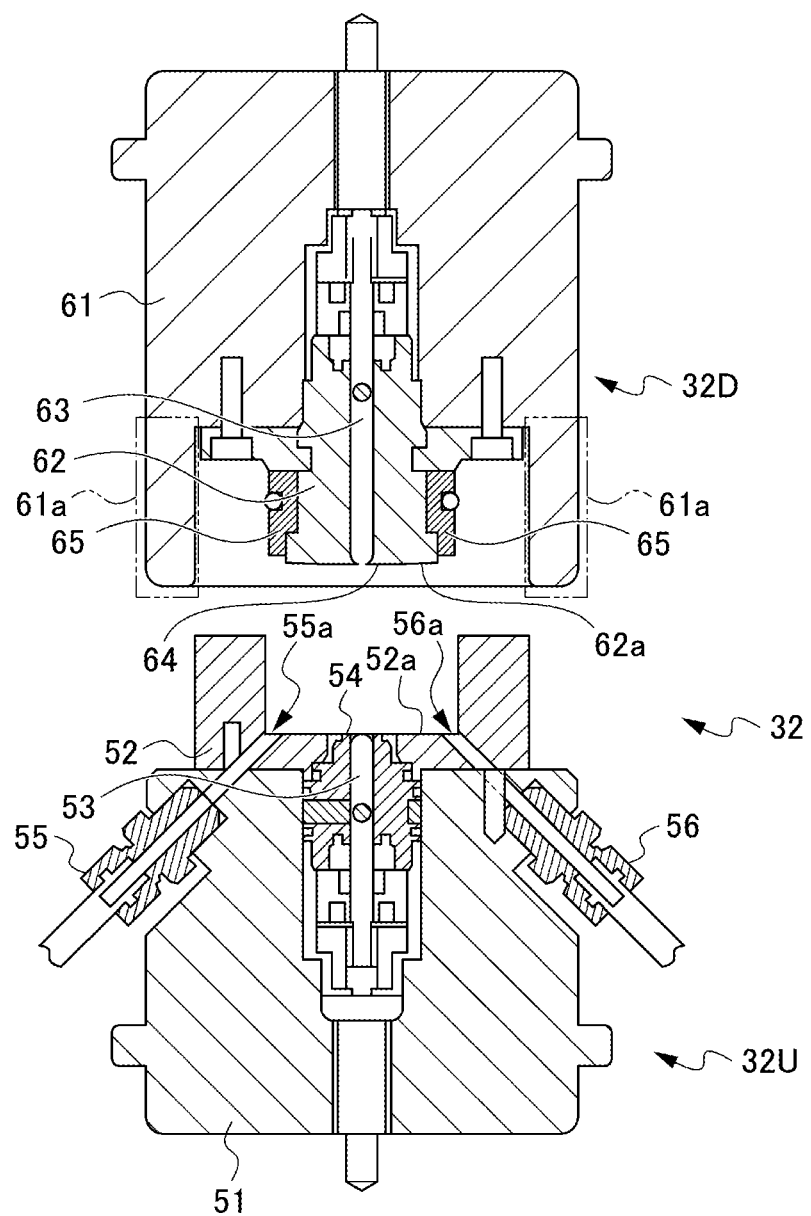
FIG. 9 is a longitudinal sectional view showing a structure of an insulating and separating valve in an electrostatic coating apparatus according to a third exemplary embodiment.

FIG. 9 is a longitudinal sectional view showing a structure of an insulating and separating valve 32 in an electrostatic coating apparatus 1 according to the third exemplary embodiment.

In a comparison between FIGS. 2 and 9, the female coupling member 32U is disposed in the upper part and the male coupling member 32D is disposed in the lower part in the insulating and separating valve 32 according to the first exemplary embodiment of FIG. 2. On the other hand, a female coupling member 32U and a male coupling member 32D are disposed in lower and upper parts in the insulating and separating valve 32 according to the third exemplary embodiment of FIG. 9, respectively. Since the other structures and operations of the electrostatic coating apparatus 1 according to the third exemplary embodiment are the same as those of the electrostatic coating apparatus 1 according to the first exemplary embodiment, their description will be omitted.

Thus, the female coupling member 32U is disposed below the male coupling member 32D. Therefore, a cleaning fluid can be prevented from dropping from a cleaning fluid supplying hole 55a or a cleaning fluid discharging hole 56a into the male coupling member 32D on an application side. Accordingly, it is possible to further suppress a fear that a current might leak out of a coating gun 13.

Moreover, the cleaning fluid supplying hole 55a and the cleaning fluid discharging hole 56a are provided with a tilt in a direction of a gravity. Therefore, the cleaning fluid left in the cleaning fluid supplying hole 55a and the cleaning fluid discharging hole 56a flows with the tilt in the direction of a gravity. Consequently, it is possible to prevent the cleaning fluid from dropping into the male coupling member 32D on the application side. Accordingly, it is possible to further suppress the fear that the current might leak out of the coating gun 13.

Fourth Exemplary Embodiment

Figure 10:
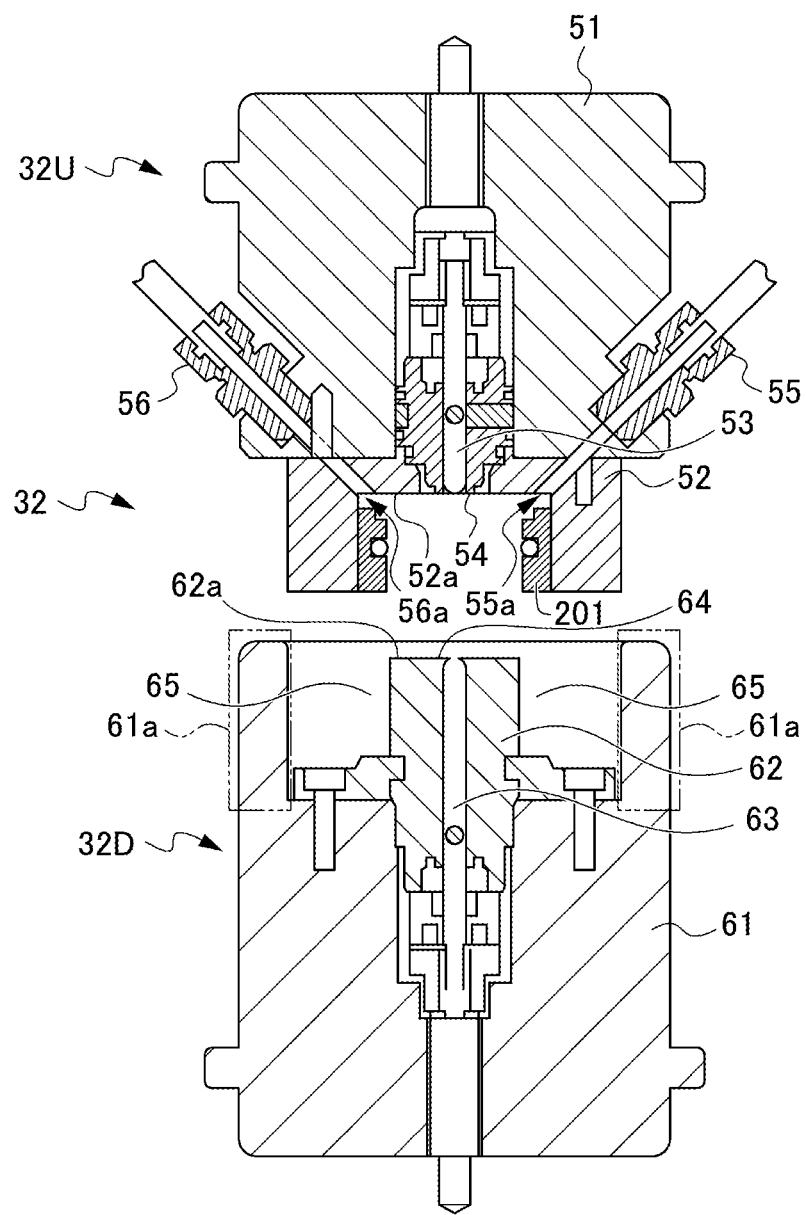
FIG. 10 is a longitudinal sectional view showing a structure of an insulating and separating valve in an electrostatic coating apparatus according to a fourth exemplary embodiment.

FIG. 10 is a longitudinal sectional view showing a structure of an insulating and separating valve 32 in an electrostatic coating apparatus 1 according to a fourth embodiment.

In a comparison between FIGS. 2 and 10, the male coupling member 32D includes the seal member 65 in the insulating and separating valve 32 according to the first exemplary embodiment of FIG. 2. On the other hand, a seal member 201 is provided in a female coupling member 32U in the insulating and separating valve 32 according to the fourth exemplary embodiment of FIG. 10. In other words, the seal member 201 is provided in an inner peripheral part of a concave portion 52 in such a manner that it is fitted in an outer peripheral surface of a convex portion 62 with connecting portions 54 and 64 separated from each other by a certain distance. Since the other structures and operations of the electrostatic coating apparatus 1 according to the fourth exemplary embodiment are the same as those in the electrostatic coating apparatus 1 according to the first exemplary embodiment, their description will be omitted.

According to the first to fourth exemplary embodiments, the following advantages can be obtained.

(1) In the prior art described in the Patent Document 1, the cleaning path for the insulating and separating valve is also formed in the coupling member (the lower valve) on the application side. For this reason, there is a possibility that an electrically conductive cleaning fluid might be left in the coupling member on the application side, resulting in a leakage of a current during electrostatic coating. In the case in which a cleaning fluid containing, as a component, amine (for instance, dimethylethylamine) to be generally used in a water-based coating material is utilized, particularly, the amine is deposited on a hose or a wall surface. For this reason, a probability of occurrence of a current leakage is increased further greatly. In order to reduce the probability of occurrence of the current leakage, therefore, it is necessary to carefully carry out an air blow after cleaning. In the case in which a cleaning retardant coating material (for instance, aqueous primer) is utilized, particularly, a great deal of time is also required for the air blow in addition to the cleaning work. On the other hand, in the first to fourth exemplary embodiments, the cleaning fluid supplying hole 55a and the cleaning fluid discharging hole 56a are provided in the female coupling member 32U on the non-application side in the insulating and separating valve 32. As a result, the cleaning path is formed in the female coupling member 32U on the non-application side and is not formed in the male coupling member 32D on the application side. Even if the electrically conductive cleaning fluid is left in the cleaning path on the non-application side, therefore, it does not enter the application side. Accordingly, there is no possibility that a current might leak out of the coating gun 13. Furthermore, it is not necessary to take the leakage of the current into consideration. Therefore, it is sufficient to carry out such a simple air blow as to push the cleaning fluid out toward the discharging side. As a result, a time taken for the air blow can also be reduced.

(2) In the prior art described in the Patent Document 1, the insulating and separating valve is cleaned in the state in which the coupling member on the application side (the lower valve) and the coupling member on the non-application side (the upper valve) are bonded to each other. For this reason, the bonding surfaces of both of the coupling members cannot be cleaned or can be cleaned insufficiently. As a result, the coating material cannot be removed sufficiently and there is a possibility that poor quality might be caused by a color mixture when a color change is then carried out. Moreover, there is also a possibility that a current might leak in electrostatic coating when a residual coating material sticks to the coupling member on the application side. On the other hand, in the first to third exemplary embodiments, the seal member 65 is provided in the male coupling member 32D, and the insulating and separating valve 32 can be cleaned with the convex portion 62 and the concave portion 52 separated from each other within the range in which the seal member 65 is fitted in the inner peripheral surface of the concave portion 52 in the female coupling member 32U. In the fourth exemplary embodiment, furthermore, the seal member 201 is provided in the female coupling member 32U, and the insulating and separating valve 32 can be cleaned with the convex portion 62 and the concave portion 52 separated from each other within the range in which the seal member 201 is fitted in the outer peripheral surface of the convex portion 62 in the male coupling member 32D. In other words, the insulating and separating valve 32 can be cleaned in the state in which the female coupling member 32U and the male coupling member 32D are held in the cleaning position. Consequently, it is possible to wholly clean the connecting portion 54 of the female coupling member 32U and the connecting portion 64 of the male coupling member 32D (which correspond to the whole bonding surfaces in the related art). As a result, it is possible to prevent poor quality from being caused by a color mixture. Moreover, the residual coating material is eliminated almost entirely. Therefore, the coating material is prevented from sticking to the application side. Consequently, there is no possibility that a current might leak out of the coating gun 13.

(3) In the first to fourth exemplary embodiments, it is possible to employ deionized water as the cleaning fluid for the insulating and separating valve 32. Consequently, it is possible to carry out the cleaning work without leaving a hard component such as calcium or magnesium.

(4) In the first to fourth exemplary embodiments, the guide portion 61a is formed on the valve body 61 of the male coupling member 32D. The guide portion 61a takes such a shape as to externally cover the portion in which the concave portion 52 is formed when the concave portion 52 is coupled to the convex portion 62, that is, the connecting portion 54 of the female coupling member 32U is connected to the connecting portion 64 of the male coupling member 32D. Accordingly, it is possible to aid the maintenance of the coupling state of the female coupling member 32U and the male coupling member 32D.

(5) In the fourth exemplary embodiment, the female coupling member 32U is disposed below the male coupling member 32D. Accordingly, the cleaning fluid can be prevented from dropping from the cleaning fluid supplying hole 55a or the cleaning fluid discharging hole 56a into the male coupling member 32D on the application side. As a result, it is possible to further suppress a possibility that a current might leak out of the coating gun 13.

(6) In the fourth exemplary embodiment, the cleaning fluid supplying hole 55a and the cleaning fluid discharging hole 56a are provided with the tilt in the direction of a gravity. Accordingly, the cleaning fluid left in the cleaning fluid supplying hole 55a and the cleaning fluid discharging hole 56a flows with the tilt in the direction of a gravity. Consequently, the cleaning fluid can be prevented from dropping into the male coupling member 32D on the application side. As a result, it is possible to further suppress the possibility that the current might leak out of the coating gun 13.

In the first to fourth exemplary embodiments, the method of fixing the male coupling member 32D and varying the female coupling member 32U is employed as the method of separating the insulating and separating valve 32. However, the separating method is not particularly restricted thereto. For instance, it is also possible to employ a method of fixing the female coupling member 32U and varying the male coupling member 32D and a method of varying both the female coupling member 32U and the male coupling member 32D.

Although the direction of separation of the insulating and separating valve 32 is also set to be the vertical direction in the first to fourth exemplary embodiments, for instance, the invention is not particularly restricted to the direction but an optional direction may be set.

Moreover, the structure of the insulating and separating valve 32 is not particularly restricted to that of each of the first to fourth exemplary embodiments. It is sufficient to employ a structure in which the cleaning path can be formed in the female coupling member 32U on the non-application side, while the cleaning path can be prevented from being formed in the male coupling member 32D on the application side. More specifically, although the cleaning fluid supplying hole 55a and the cleaning fluid discharging hole 56a are provided on the bottom face 52a of the concave portion 52 in the female coupling member 32U in the first to fourth exemplary embodiments, for instance, the invention is not restricted thereto. For instance, it is also possible to dispose them in positions in which the cleaning solution can be supplied to the connecting portion 54 of the female coupling member 32U and the connecting portion 64 of the male coupling member 32D and can be discharged therefrom, more specifically, in the vicinity of the bottom face 52a of the concave portion 52 when the connecting portions 54 and 64 are provided apart from a position for the connecting state by a predetermined distance.

Although the cleaning fluid supplying hole 55a and the cleaning fluid discharging hole 56a are provided in the female coupling member 32U in the first to fourth exemplary embodiments, for instance, the invention is not restricted thereto. For instance, the cleaning fluid supplying hole 55a and the cleaning fluid discharging hole 56a may be provided in the male coupling member 32D.

Fifth Exemplary Embodiment

Figure 11:
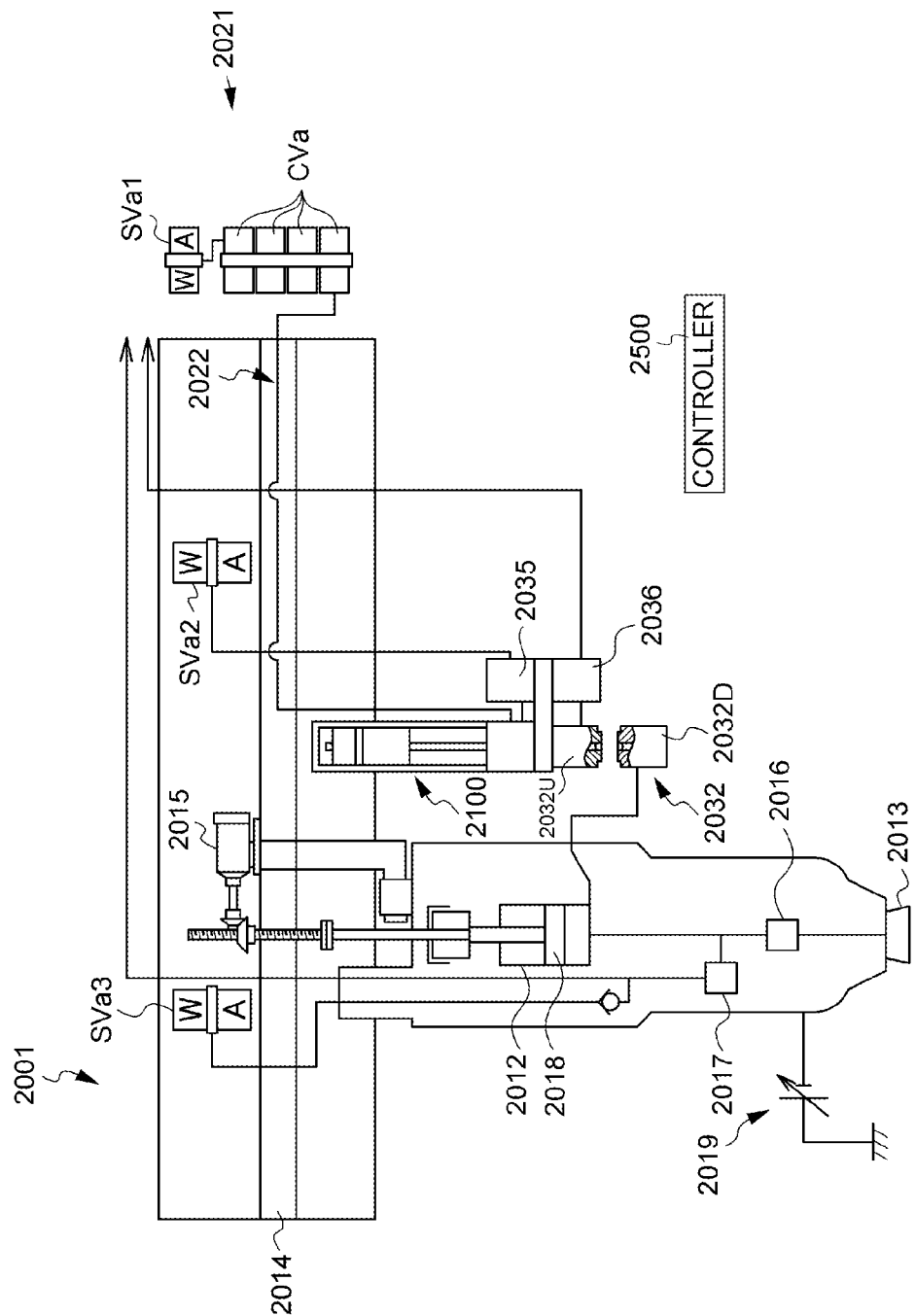
FIG. 11 is a view showing a schematic structure of an electrostatic coating apparatus according to a fifth exemplary embodiment.

FIG. 11 is a view showing a schematic structure of an electrostatic coating apparatus 2001 to which a connecting device for a fluid passage according to a fifth exemplary embodiment of the invention is applied.

The electrostatic coating apparatus 2001 includes a bell type coating gun 2013 and a coating material supplying surface 2021 for selectively supplying plural types of electrically conductive coating materials to the coating gun 2013 through a coating material supplying path 2022. In the electrostatic coating apparatus 2001, an electrically conductive coating material which is charged is sprayed from the coating gun 2013 onto an object to be coated so that the object to be coated is electrostatically coated. More specifically, examples of the object to be coated include a body of a car.

The coating material supplying source 2021 includes a coating material tank (not shown) in which plural types of electrically conductive coating materials (hereinafter referred to as "coating materials") are stored, a coating material pump (not shown) for compression transporting the coating material stored in the coating material tank to the coating material supplying path 2022, and a color change valve CVa for controlling a flow rate of each coating material.

The color change valve CVa is provided in a passage for connecting the coating material tank for storing various coating materials to the coating material supplying path 2022, and opens/closes the passage. Consequently, it is possible to control the flow rate of the coating material to be supplied to the coating gun 2013 through the coating material supplying path 2022.

As a mechanism for cleaning the color change valve CVa or the coating material supplying path 2022 in a color change of the coating material, moreover, a first cleaning valve SVa1 for controlling a supply of air (A) and a cleaning fluid (W) is connected to the color change valve CVa. The color change valve CVa and the first cleaning valve SVa1 are connected to a controller 2500 through an actuator for driving them, and are operated based on a control signal sent from the controller 2500.

The coating material supplying path 2022 is extended from the color change valve CVa to an intermediate reservoir 2012 which is connected to the coating gun 2013 and will be described below. The coating material supplying path 2022 reaches the intermediate reservoir 2012 which is connected to the coating gun 2013 and will be described below from the color change valve CVa. In other words, the coating material supplied from the coating material supplying source 2021 is once stored in the intermediate reservoir 2012.

The intermediate reservoir 2012 is provided with a piston 2018 and a servomotor 2015 for precisely controlling a position of the piston 2018. When the servomotor 2015 is driven to move the piston 2018 forward (a downward movement in FIG. 11), the coating material stored in the intermediate reservoir 2012 is compression transported to the coating gun 2013 through a trigger valve 2016. When the servomotor 2015 is driven to move the piston 2018 backward (an upward movement in FIG. 11), moreover, the coating material is sucked from the coating material supplying path 2022 and is stored in the intermediate reservoir 2012. The trigger valve 2016 controls the supply of the coating material from the intermediate reservoir 2012 to the coating gun 2013.

The coating gun 2013 sprays the coating material supplied from the coating material supplying path 2022 through the intermediate reservoir 2012 from a tip thereof toward an object to be coated. More specifically, a high voltage of approximately −60000 volts is applied to the coating gun 2013 by means of a voltage applying unit 2019 to charge and atomize the coating material supplied from the intermediate reservoir 2012, and sprays the atomized coating material from the tip in coating. Thus, electrostatic coating is carried out.

The coating gun 2013 is fixed to a ram 2014 provided to enable vertical and transverse reciprocations. Accordingly, it is possible to spray the coating material onto the object to be coated while reciprocating the ram 2014 vertically and transversely depending on a shape of the object to be coated, thereby maintaining an almost constant interval between the tip of the coating gun 2013 and the object to be coated.

As a mechanism for cleaning the coating gun 2013, moreover, a third cleaning valve SVa3 and a dump valve 2017 are connected to the coating gun 2013. The third cleaning valve SVa3 controls a supply of the air (A) and the cleaning fluid (W) which are to be used for cleaning the coating gun 2013. The dump valve 2017 controls a discharge of a waste liquid of the coating material in a color change. The trigger valve 2016, the dump valve 2017 and the third cleaning valve SVa3 are connected to the controller 2500 through an actuator for driving them, and are operated based on a control signal sent from the controller 2500.

The coating material supplying path 2022 is provided with an insulating and separating valve 2032 serving as a connecting device for a connection or separation of the coating material supplying path 2022. The insulating and separating valve 2032 includes a female coupling member 2032U, a male coupling member 2032D for making a pair with the female coupling member 2032U, and a separating mechanism 2100 for connecting the female coupling member 2032U to the male coupling member 2032D or separating them from each other. As will be described below in detail with reference to FIG. 12, a coating material passage for communicating with the coating material supplying path 2022 is formed in each of the female coupling member 2032U and the male coupling member 2032D. The separating mechanism 2100 relatively moves the female coupling member 2032U and the male coupling member 2032D and connects the coating material passages formed therein, thereby forming a single passage.

As a mechanism for cleaning the insulating and separating valve 2032 and the coating material supplying path 2022, a second cleaning valve SVa2, a cleaning fluid supply switching valve 2035 and a cleaning fluid discharge switching valve 2036 are connected to the insulating and separating valve 2032. The second cleaning valve SVa2 controls the supply of the air (A) and the cleaning fluid (W) which are to be used for cleaning the insulating and separating valve 2032. The cleaning fluid supply switching valve 2035 controls the supply of the air or the cleaning fluid from the second cleaning valve SVa2 to the female coupling member 2032U. The cleaning fluid discharge switching valve 2036 controls a discharge of the air or the cleaning fluid from the female coupling member 2032U. It is preferable to use deionized water for the cleaning fluid.

Figure 12:
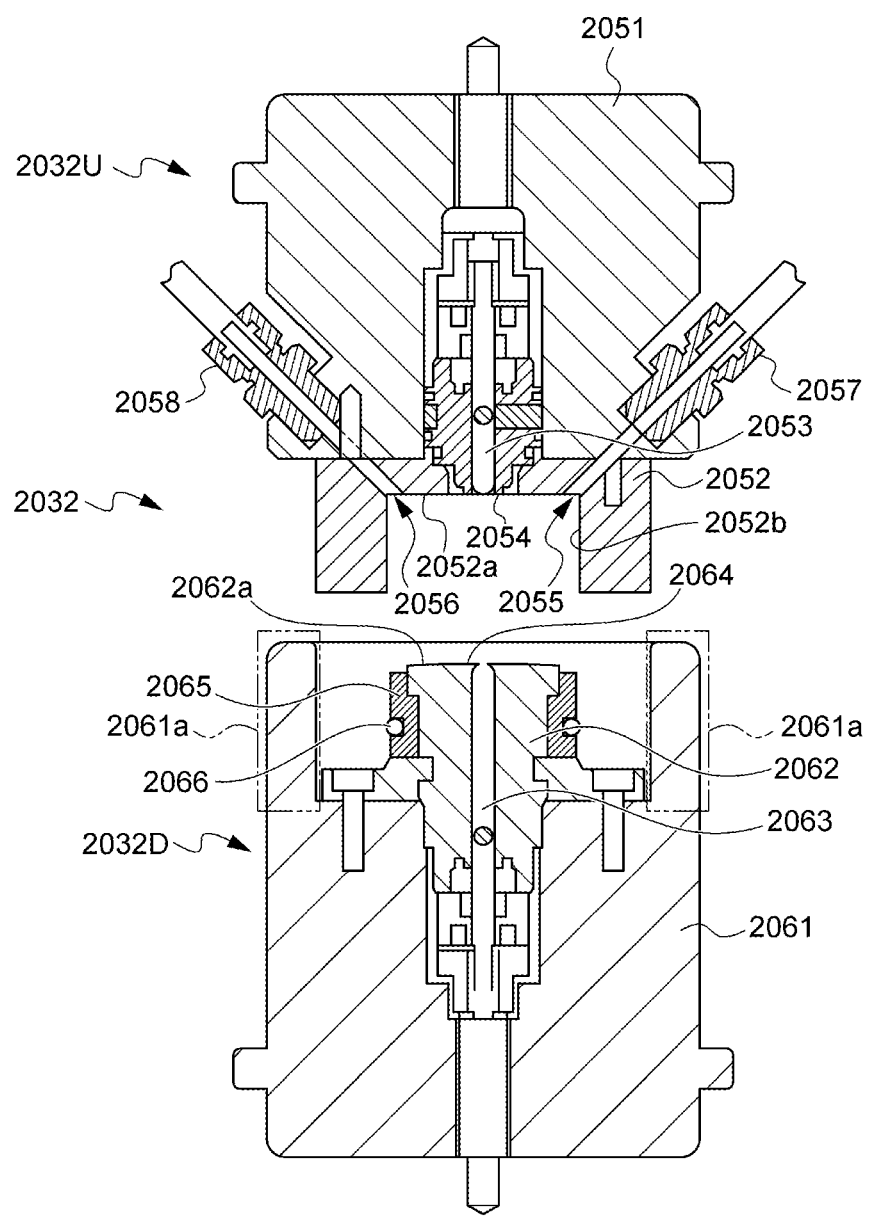
FIG. 12 is a longitudinal sectional view showing structures of a female coupling member and a male coupling member in an insulating and separating valve according to the fifth exemplary embodiment.

FIG. 12 is a longitudinal sectional view showing structures of the female coupling member 2032U and the male coupling member 2032D in the insulating and separating valve 2032. The female coupling member 2032U and the male coupling member 2032D are disposed in a vertical direction, and the female coupling member 2032U is provided above the male coupling member 2032D.

The female coupling member 2032U includes an almost cylindrical valve body 2051 and a concave portion 2052. The concave portion 2052 is provided on a lower end side of the valve body 2051 with a concave surface 2052a turned downward.

A first coating material passage 2053 is formed on an almost center of the female coupling member 2032U. The first coating material passage 2053 penetrates through the valve body 2051 and the concave portion 2052 and reaches the concave surface 2052a of the concave portion 2052. The first coating material passage 2053 is extended in the vertical direction and is connected to the coating material supplying source 2021 side of the coating material supplying path 2022. In the first coating material passage 2053, moreover, the coating material, the air and the cleaning fluid flow in a downward direction. The concave portion 2052 is coupled to a convex portion 2062 of the male coupling member 2032D which will be described below. Moreover, a part to be an opening of the first coating material passage 2053 in the concave surface 2052a of the concave portion 2052 serves as a first connecting portion 2054 to come in contact with a convex surface 2062a of the convex portion 2062 when the concave portion 2052 is coupled to the convex portion 2062 of the male coupling member 2032D.

A cleaning fluid supplying hole 2055 penetrating through the valve body 2051 and the concave portion 2052 is formed in the female coupling member 2032U. The cleaning fluid supplying hole 2055 is extended from a side part of the valve body 2051 toward the first connecting portion 2054 in the concave surface 2052a in a radial direction of the valve body 2051. The air or cleaning fluid supplied from the second cleaning valve SVa2 (see FIG. 11) is fed to the cleaning fluid supplying hole 2055 through a cleaning fluid supplying member 2057 provided in a side part on a right side of FIG. 12 in the valve body 2051.

Moreover, a cleaning fluid discharging hole 2056 penetrating through the valve body 2051 and the concave portion 2052 is formed in an opposed part to the cleaning fluid supplying hole 2055 in the female coupling member 2032U. The cleaning fluid discharging hole 2056 is extended from the side part of the valve body 2051 toward the first connecting portion 2054 in the concave surface 2052a in the radial direction of the valve body 2051. The air or cleaning fluid supplied from the cleaning fluid supplying hole 2055 to the first connecting portion 2054 side flows through the cleaning fluid discharging hole 2056 and is then discharged to an outside of the insulating and separating valve 2032 through a cleaning fluid discharging member 2058 provided in a side part on a left side of FIG. 12 in the valve body 2051.

On the other hand, the male coupling member 2032D includes an almost cylindrical valve body 2061 and the convex portion 2062. The convex portion 2062 is provided on an upper end side of the valve body 2061 with the convex surface 2062a turned upward.

A second coating material passage 2063 is formed on an almost center of the male coupling member 2032D. The second coating material passage 2063 penetrates through the valve body 2061 and the convex portion 2062, and reaches the convex surface 2062a of the convex portion 2062. The second coating material passage 2063 is extended in the vertical direction and is connected to the intermediate reservoir 2012 side of the coating material supplying path 2022. In the second coating material passage 2063, moreover, the coating material, the air and the cleaning fluid flow in a downward direction.

A part to be an opening of the second coating material passage 2063 in the convex surface 2062a of the convex portion 2062 serves as a second connecting portion 2064. The concave portion 2052 and the convex portion 2062 are coupled to each other to cause the first connecting portion 2054 and the second connecting portion 2064 to closely come in contact with each other. Consequently, the first coating material passage 2053 of the female coupling member 2032U is connected to the second coating material passage 2063 of the male coupling member 2032D so that a single passage is formed. Although the first connecting portion 2054 and the second connecting portion 2064 are formed as partial regions of the concave surface 2052a and the convex surface 2062a respectively in the exemplary embodiment, the invention is not restricted thereto but the concave portion 2052 and the convex portion 2062 may be constituted by separate members.

Furthermore, a cylindrical seal member holding portion 2065 having a circular groove formed thereon is provided in an outer peripheral part of the convex portion 2062. A circular seal member 2066 is fitted in the groove. When the convex portion 2062 and the concave portion 2052 are coupled to each other, the seal member 2066 closely comes in contact with an inner peripheral surface 2052b of the concave portion 2052. Consequently, a space between the concave portion 2052 and the convex portion 2062, that is, a space including the first connecting portion 2054, the second connecting portion 2064, the cleaning fluid supplying hole 2055 and the cleaning fluid discharging hole 2056 is sealed.

Moreover, a cylindrical covering portion 2061a is formed on a tip side of the valve body 2061. The covering portion 2061a covers the concave portion 2052 and the convex portion 2062 in a state in which the concave portion 2052 and the convex portion 2062 are coupled to each other, and maintains their coupling state.

Figure 13:
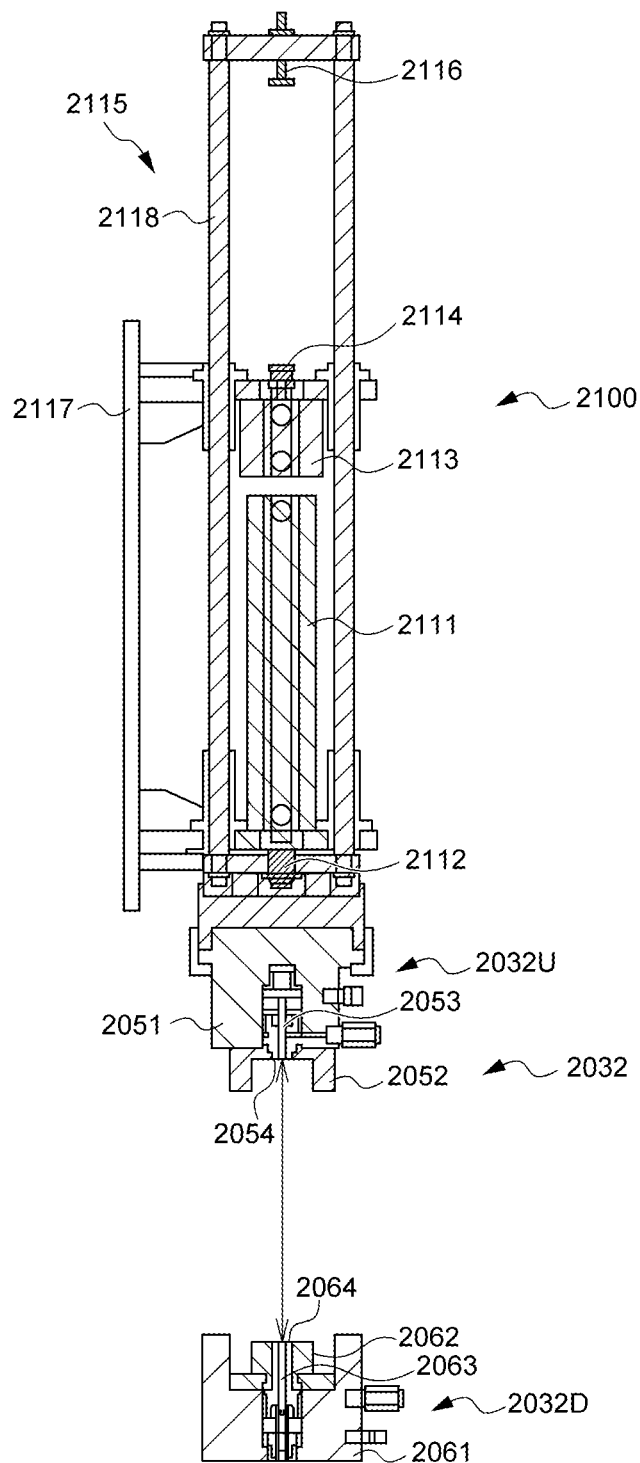
FIG. 13 is a longitudinal sectional view showing a structure of a separating mechanism in the insulating and separating valve according to the fifth exemplary embodiment.

FIG. 13 is a longitudinal sectional view showing a schematic structure of the separating mechanism 2100. The separating mechanism 2100 includes a movable housing 2115 to which the female coupling member 2032U is fixed, and a main cylinder 2111 and a cylinder 2113 for a cleaning position which are provided in the movable housing 2115.

The main cylinder 2111 includes a main rod 2112 which is provided to enable forward and backward movements in a vertical direction with respect to a cylinder body thereof. The main cylinder 2111 is an air cylinder and generates a thrust depending on an operating pressure to protrude the main rod 2112 when compressed air is supplied to the cylinder body by means of a compressor which is not shown.

The cylinder 2113 for a cleaning position includes a rod 2114 for a cleaning position which is provided to enable forward and backward movements in a vertical direction with respect to a cylinder body thereof. The cylinder 2113 for a cleaning position is an air cylinder and generates a thrust depending on an operating pressure to protrude the main rod 2112 when compressed air is supplied to the cylinder body by means of the compressor.

In a comparison between the main cylinder 2111 and the cylinder 2113 for a cleaning position, a stroke amount of the main rod 2112 of the main cylinder 2111 is larger than that of the rod 2114 for a cleaning position of the cylinder 2113 for a cleaning position. Moreover, a cylinder diameter of the cylinder 2113 for a cleaning position is larger than that of the main cylinder 2111. In the case in which the cylinders 2111 and 2113 are driven at an equal operating pressure, accordingly, the cylinder 2113 for a cleaning position can protrude the rod 2114 for a cleaning position by a greater thrust than the main cylinder 2111.

The movable housing 2115 includes a cylinder holding portion 2117 for holding the main cylinder 2111 and the cylinder 2113 for a cleaning position, and a frame member 2118 provided slidably in a vertical direction with respect to the cylinder holding portion 2117.

The main cylinder 2111 is held by the cylinder holding portion 2117 with the main rod 2112 turned downward. The cylinder 2113 for a cleaning position is held by the cylinder holding portion 2117 with the rod 2114 for a cleaning position turned upward at an upper side of the main rod 2112. In other words, the main cylinder 2111 and the cylinder 2113 for a cleaning position generate thrusts in reverse directions to each other. Furthermore, the compressor for causing the main cylinder 2111 and the cylinder 2113 for a cleaning position to generate the thrusts is connected to the controller 2500, and is operated based on a control signal sent from the controller 2500. Accordingly, the thrusts generated by the cylinders 2111 and 2113 are controlled by the controller 2500.

A tip of the main rod 2112 and an upper end side of the female coupling member 2032U are fixed to a lower end side of the frame member 2118. By moving the main rod 2112 forward and backward through the main cylinder 2111, therefore, it is possible to vertically move the female coupling member 2032U together with the frame member 2118. More specifically, the female coupling member 2032U approaches the male coupling member 2032D when the main rod 2112 is moved forward, and the female coupling member 2032U is moved apart from the male coupling member 2032D when the main rod 2112 is retreated.

On the other hand, a stopper 2116 is provided on an upper end side of the frame member 2118. The rod 2114 for a cleaning position of the cylinder 2113 for a cleaning position abuts on the stopper 2116. In other words, when the rod 2114 for a cleaning position is moved forward, a tip of the rod 2114 for a cleaning position abuts on the stopper 2116. Consequently, a downward movement of the frame member 2118 is controlled. When the rod 2114 for a cleaning position is further moved forward in a state in which the tip of the rod 2114 for a cleaning position abuts on the stopper 2116, moreover, the frame member 2118 can be upward moved together with the female coupling member 2032U.

In the electrostatic coating apparatus 2001 having the structure described above, filling of the coating material into the intermediate reservoir 2012, electrostatic coating to be carried out by the coating material which is filled and cleaning of the insulating and separating valve 2032 are performed by the controller 2500 in the following procedures, respectively.

Figure 14:
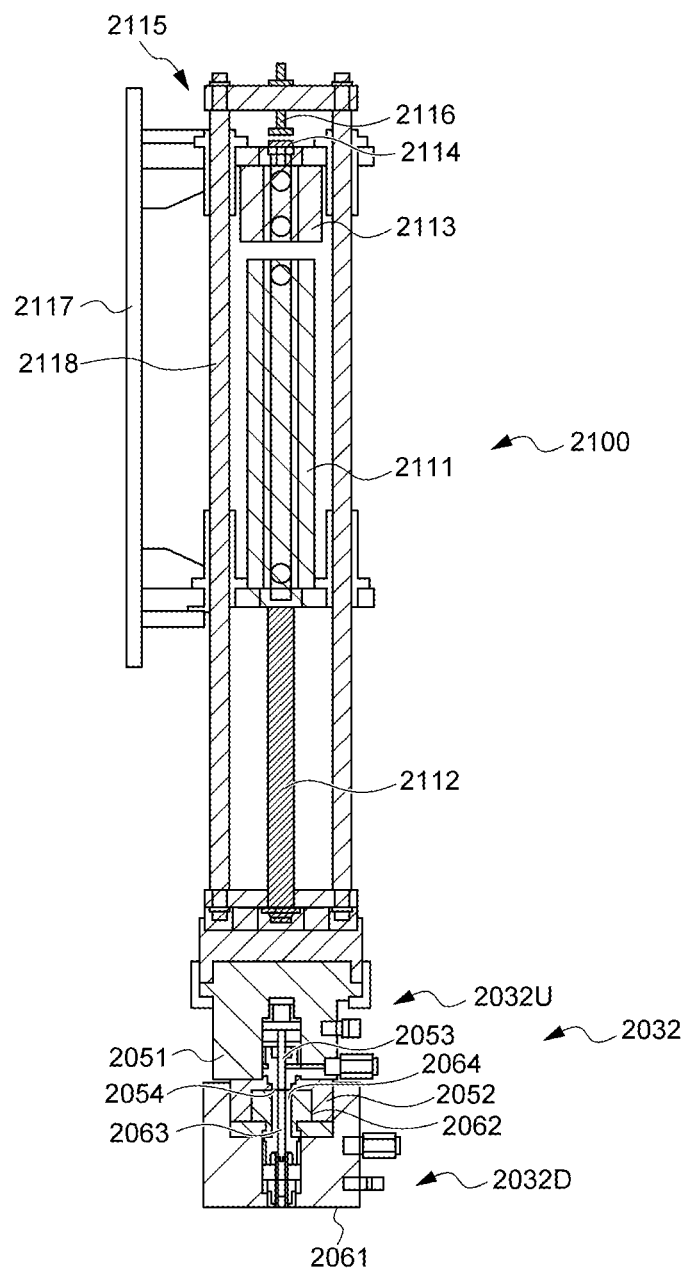
FIG. 14 is a view for explaining an operation of the separating mechanism in the insulating and separating valve according to the fifth exemplary embodiment.
Figure 15:
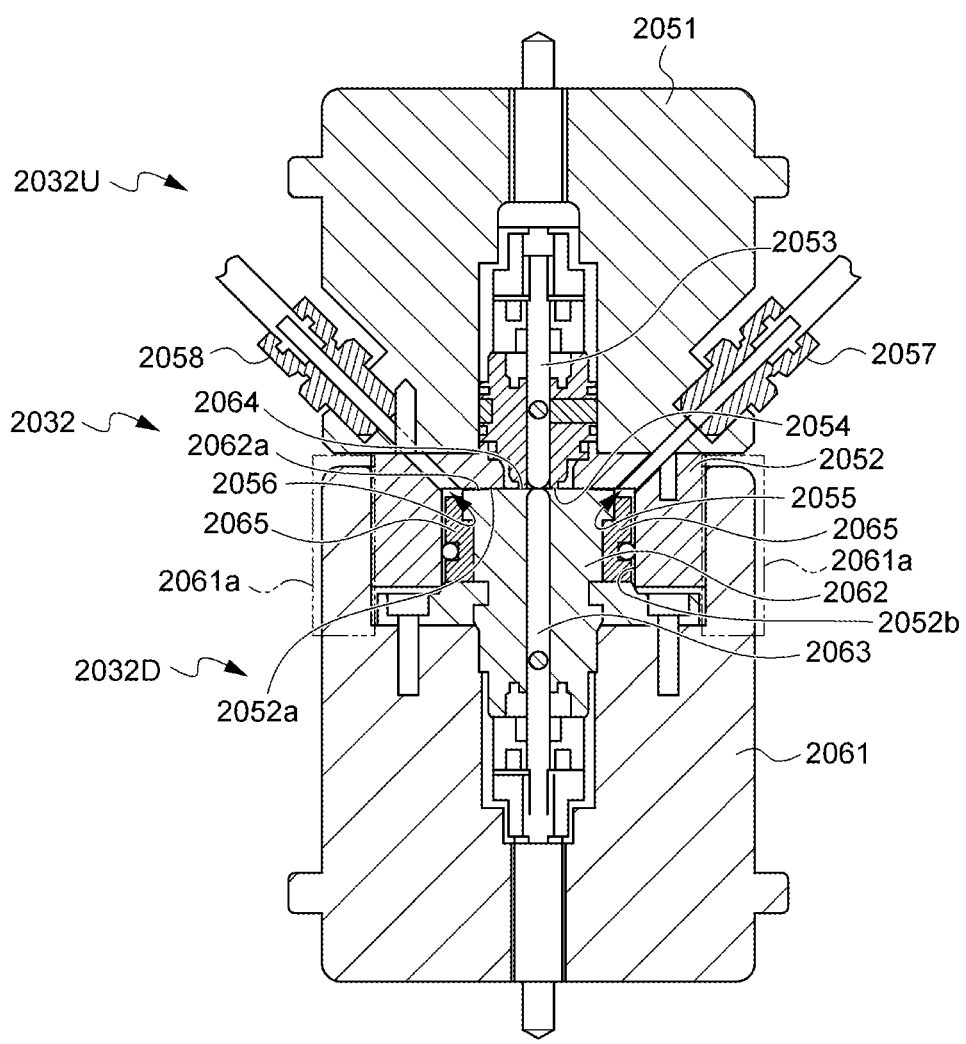
FIG. 15 is a view for explaining an operation of the female coupling member and the male coupling member in the insulating and separating valve according to the fifth exemplary embodiment.

A procedure for filling the coating material into the intermediate reservoir 2012 is as follows. First of all, the main rod 2112 of the main cylinder 2111 is moved forward to move the female coupling member 2032U downward together with the frame member 2118, thereby causing the female coupling member 2032U to approach the male coupling member 2032D (see FIG. 14). As shown in FIG. 15, consequently, the concave portion 2052 of the female coupling member 2032U is coupled to the convex portion 2062 of the male coupling member 2032D and the first connecting portion 2054 closely comes in contact with the second connecting portion 2064 so that the first coating material passage 2053 is connected to the second coating material passage 2063, thereby forming a single coating material passage which reaches the intermediate reservoir 2012 from the coating material supplying source 2021. Next, the coating material is filled into the intermediate reservoir 2012 from the coating material supplying source 2021 through the coating material supplying path 2022. When the main rod 2112 is moved forward, the rod 2114 for a cleaning position in the cylinder 2113 for a cleaning position is retreated. When the frame member 2118 is moved downward, consequently, the rod 2114 for a cleaning position is prevented from abutting on the stopper 2116.

A procedure for filling the coating material into the intermediate reservoir 2012 as described above and then carrying out electrostatic coating with the coating material is as follows. First of all, the main rod 2112 of the main cylinder 2111 is retreated in the state shown in FIG. 14 to upward move the female coupling member 2032U together with the frame member 2118, thereby separating the female coupling member 2032U from the male coupling member 2032D (see FIG. 13). Consequently, the coating material supplying path 2022 is divided into an application side which is conducted to the coating gun 2013 (the intermediate reservoir 2012 side with respect to the male coupling member 2032D) and a non-application side which is insulated from the coating gun 2013 (the coating material supplying source 2021 side with respect to the female coupling member 2032U). Subsequently, a high voltage is applied to the coating gun 2013, and furthermore, the coating material stored in the intermediate reservoir 2012 is charged, and at the same time, is sprayed onto an object to be coated.

Figure 16:
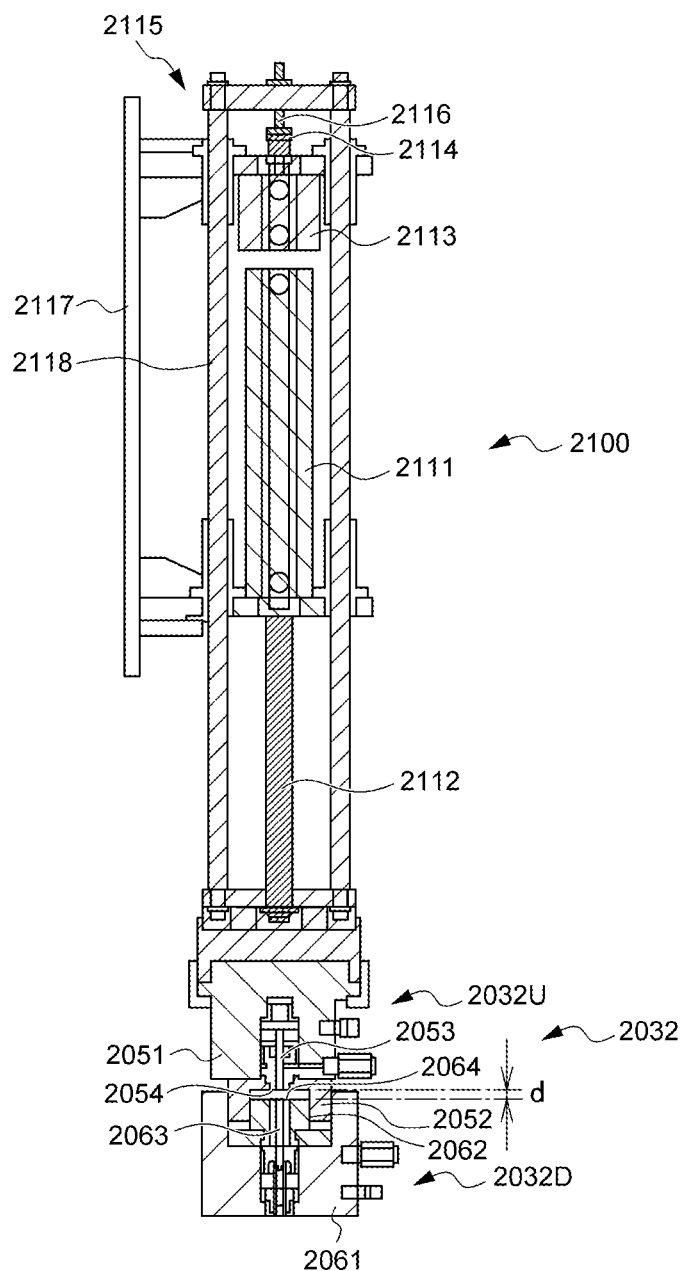
FIG. 16 is a view for explaining the operation of the separating mechanism in the insulating and separating valve according to the fifth exemplary embodiment.

A procedure for carrying out the electrostatic coating as described above and then cleaning the insulating and separating valve 2032 to perform a color change over the coating material is as follows. First of all, the main rod 2112 of the main cylinder 2111 and the rod 2114 for a cleaning position in the cylinder 2113 for a cleaning position are moved forward, respectively. Thus, a clearance is formed between the first connecting portion 2054 of the female coupling member 2032U and the second connecting portion 2064 of the male coupling member 2032D (see FIG. 16). In other words, the main cylinder 2111 generates a thrust in a downward direction to move the main rod 2112 forward, thereby causing the first connecting portion 2054 to approach the second connecting portion 2064. On the other hand, the cylinder 2113 for a cleaning position generates a greater thrust in an upward direction than the main cylinder 2111 to push the stopper 2116 upward through the rod 2114 for a cleaning position, thereby separating the first connecting portion 2054 from the second connecting portion 2064. Thus, the thrusts are generated in opposite directions to each other by the two cylinders 2111 and 2113, thereby forming a clearance having a predetermined length d (for instance, d=0.5 mm) between the first connecting portion 2054 and the second connecting portion 2064. The length d of the clearance between the first connecting portion 2054 and the second connecting portion 2064 is set into a range in which the seal member 2066 does not slip out of the concave portion 2052, that is, the seal member 2066 of the convex portion 2062 closely comes in contact with the inner peripheral surface of the concave portion 2052. Next, the cleaning fluid is supplied from the cleaning fluid supplying hole 2055 to the clearance to clean the first connecting portion 2054 and the second connecting portion 2064. The cleaning fluid subjected to the cleaning work is discharged from the cleaning fluid discharging hole 2056.

When the cleaning fluid is supplied, a force in such a direction as to separate the first connecting portion 2054 from the second connecting portion 2064 against the thrust generated in the main cylinder 2111 by a water pressure of the cleaning fluid, that is, in an upward direction acts on the first connecting portion 2054. Therefore, the controller 2500 controls the downward thrust generated in the main cylinder 2111 so as to be greater than the upward thrust generated by the water pressure of the cleaning fluid and to be equal to or smaller than the upward thrust generated in the cylinder 2113 for a cleaning position. Consequently, it is possible to prevent the seal member 2066 from slipping out of the concave portion 2052 by the water pressure of the cleaning fluid while forming the clearance between the first connecting portion 2054 and the second connecting portion 2064 during the cleaning work.

According to the fifth exemplary embodiment, the following advantages can be obtained.

(1) The thrust generated in the main cylinder 2111 is controlled to be greater than the force acting in the direction for separating the first connecting portion 2054 from the second connecting portion 2064 in the supply of the cleaning fluid and to be equal to or smaller than the thrust generated in the cylinder 2113 for a cleaning position. Even if the supply of the cleaning fluid is started, consequently, the interval between the first connecting portion 2054 and the second connecting portion 2064 can be properly maintained to prevent the seal member 2066 from slipping out of the concave portion 2052. Thus, it is possible to clean the first connecting portion 2054 and the second connecting portion 2064 without a residue. Moreover, it is possible to clean the first and second connecting portions 2054 and 2064 without the residual coating material as described above. Therefore, it is possible to more reliably prevent a leakage of a current when charging the coating gun 2013. Accordingly, the coating material can be charged efficiently. Thus, it is possible to enhance a coating efficiency and quality of a product.

(2) The cylinder diameter of the cylinder 2113 for a cleaning position is set to be greater than that of the main cylinder 2111. Therefore, also in the case in which the cylinders 2111 and 2113 are operated at an equal operating pressure, for instance, the thrust generated in the cylinder 2113 for a cleaning position can be set to be greater than that generated in the main cylinder 2111. Accordingly, it is possible to reliably form the clearance between the first connecting portion 2054 and the second connecting portion 2064, thereby carrying out the cleaning work.

(3) The insulating and separating valve 2032 is cleaned with the deionized water. Consequently, it is possible to carry out the cleaning work without leaving a hard component such as calcium or magnesium.

Although the female coupling member 2032U and the male coupling member 2032D are disposed in the vertical direction in the fifth exemplary embodiment, the invention is not restricted thereto. For instance, the female coupling member and the male coupling member may be disposed horizontally.

Although the female coupling member 2032U is caused to approach the male coupling member 2032D, thereby connecting the first coating material passage 2053 to the second coating material passage 2063 in the fifth exemplary embodiment, moreover, the invention is not restricted thereto. For instance, it is also possible to cause the male coupling member to approach the female coupling member, thereby connecting the first and second coating material passages.

Although the cleaning fluid supplying hole and the cleaning fluid discharging hole are formed on the female coupling member in the fifth exemplary embodiment, furthermore, the invention is not restricted thereto but they may be formed on the male coupling member.

In addition, although the seal member 2066 and the seal member holding portion 2065 for holding the seal member 2066 are provided in the outer peripheral part of the convex portion 2062 in the male coupling member 2032D in the fifth exemplary embodiment, the invention is not restricted thereto.

Variant of Fifth Exemplary Embodiment

Figure 17:
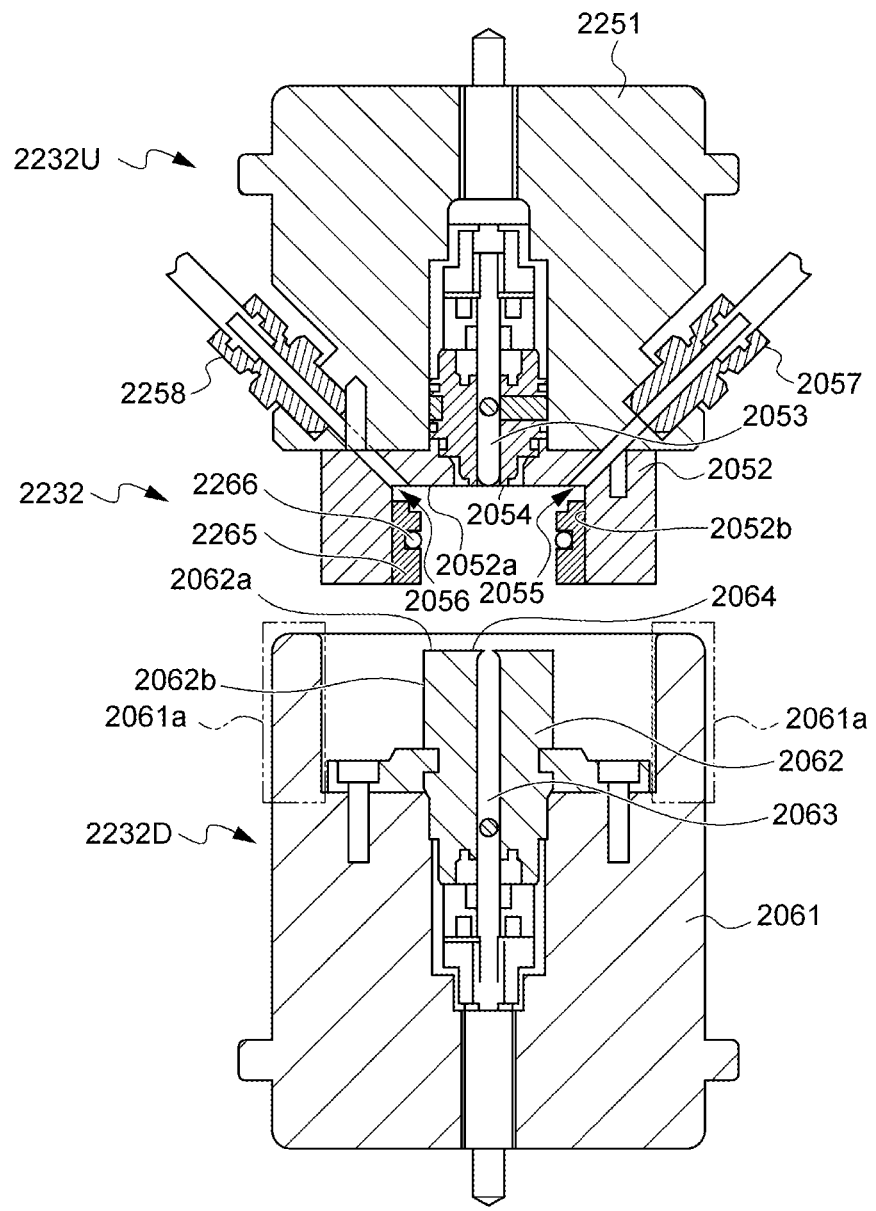
FIG. 17 is a longitudinal sectional view showing structures of a female coupling member and a male coupling member in an insulating and separating valve according to a variant of the fifth exemplary embodiment.

FIG. 17 is a longitudinal sectional view showing structures of a female coupling member 2232U and a male coupling member 2232D in an insulating and separating valve 2232 according to a variant of the fifth exemplary embodiment. As shown in FIG. 17, a seal member 2266 and a seal member holding portion 2265 for holding the seal member 2266 may be provided on an inner peripheral surface 2052b of a concave portion 2052 in the female coupling member 2232U. In this case, when a convex portion 2062 is coupled to the concave portion 2052, the seal member 2266 closely comes in contact with an outer peripheral surface 2062b of the convex portion 2062. In the same manner as in the fifth exemplary embodiment, consequently, there is sealed a space including a first connecting portion 2054, a second connecting portion 2064, a cleaning fluid supplying hole 2055 and a cleaning fluid discharging hole 2056 between the concave portion 2052 and the convex portion 2062.

Sixth Exemplary Embodiment

Figure 18:
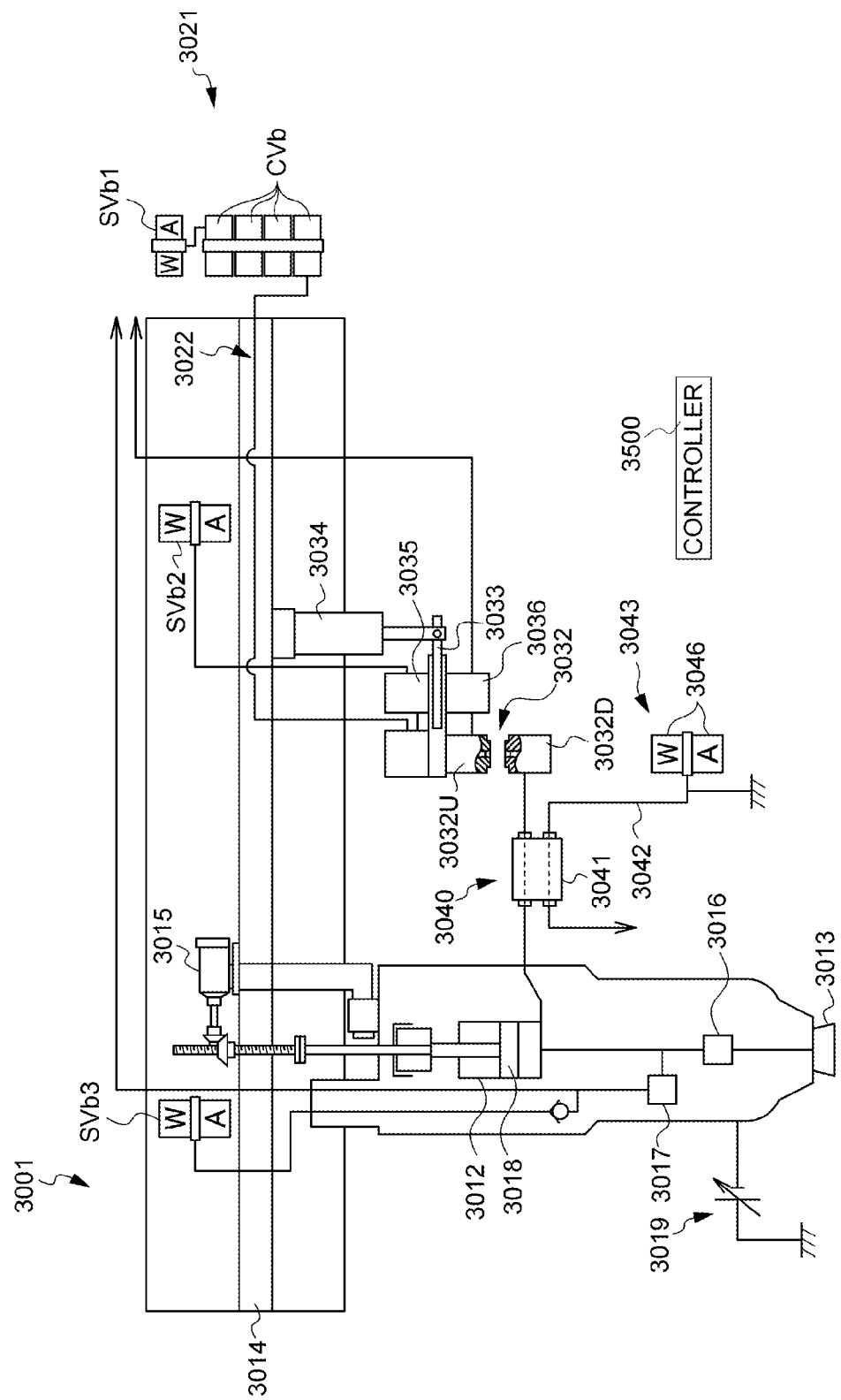
FIG. 18 is a view showing a schematic structure of an electrostatic coating apparatus according to a sixth exemplary embodiment.

FIG. 18 is a view showing a schematic structure of an electrostatic coating apparatus 3001 according to a sixth exemplary embodiment of the invention.

The electrostatic coating apparatus 3001 includes a bell type coating gun 3013 and a coating material supplying source 3021 for selectively supplying plural types of electrically conductive coating materials to the coating gun 3013 through a coating material supplying path 3022. The electrostatic coating apparatus 3001 sprays an electrically conductive coating material which is charged from the coating gun 3013 onto an object to be coated, thereby carrying out electrostatic coating over the object to be coated. More specifically, examples of the object to be coated include a body of a car.

The coating material supplying source 3021 includes a coating material tank (not shown) in which plural types of electrically conductive coating materials (hereinafter referred to as "coating materials") are stored, a coating material pump (not shown) for compression transporting the coating material stored in the coating material tank to the coating material supplying path 3022, and a color change valve CVb for controlling a flow rate of each coating material.

The color change valve CVb is provided in a passage for connecting the coating material tank for storing various coating materials to the coating material supplying path 3022, and opens/closes the passage. Consequently, it is possible to control the flow rate of the coating material to be supplied to the coating gun 3013 through the coating material supplying path 3022.

As a mechanism for cleaning the color change valve CVb or the coating material supplying path 3022 in a color change of the coating material, moreover, a first cleaning valve SVb1 for controlling a supply of air (A) and a cleaning fluid (W) is connected to the color change valve CVb. The color change valve CVb and the first cleaning valve SVb1 are connected to a controller 3500 through an actuator for driving them, and are operated based on a control signal sent from the controller 3500.

The coating material supplying path 3022 is extended from the color change valve CVb to an intermediate reservoir 3012 which is connected to the coating gun 3013 and will be described below. The coating material supplying path 3022 reaches the intermediate reservoir 3012 which is connected to the coating gun 3013 and will be described below from the color change valve CVb. In other words, the coating material supplied from the coating material supplying source 3021 is once stored in the intermediate reservoir 3012.

The intermediate reservoir 3012 is provided with a piston 3018 and a servomotor 3015 for precisely controlling a position of the piston 3018. When the servomotor 3015 is driven to move the piston 3018 forward (a downward movement in FIG. 18), the coating material stored in the intermediate reservoir 3012 is compression transported to the coating gun 3013 through a trigger valve 3016. When the servomotor 3015 is driven to move the piston 3018 backward (an upward movement in FIG. 18), moreover, the coating material is sucked from the coating material supplying path 3022 and is stored in the intermediate reservoir 3012. The trigger valve 3016 controls the supply of the coating material from the intermediate reservoir 3012 to the coating gun 3013.

The coating gun 3013 sprays the coating material supplied from the coating material supplying path 3022 through the intermediate reservoir 3012 from a tip thereof toward an object to be coated. More specifically, a high voltage of approximately −60000 volts is applied to the coating gun 3013 by means of a voltage applying unit 3019 to charge and atomize the coating material supplied from the intermediate reservoir 3012 and to then spray the atomized coating material from the tip in coating. Thus, electrostatic coating is carried out.

The coating gun 3013 is fixed to a ram 3014 provided to enable vertical and transverse reciprocations. Accordingly, it is possible to spray the coating material onto the object to be coated while reciprocating the ram 3014 vertically and transversely depending on a shape of the object to be coated, thereby maintaining an almost constant interval between the tip of the coating gun 3013 and the object to be coated.

As a mechanism for cleaning the coating gun 3013, moreover, a third cleaning valve SVb3 and a dump valve 3017 are connected to the coating gun 3013. The third cleaning valve SVb3 controls a supply of the air (A) and the cleaning fluid (W) which are to be used for cleaning the coating gun 3013. The dump valve 3017 controls a discharge of a waste liquid of the coating material in a color change. The trigger valve 3016, the dump valve 3017 and the third cleaning valve SVb3 are connected to the controller 3500 through an actuator for driving them, and are operated based on a control signal sent from the controller 3500.

The coating material supplying path 3022 is provided with an insulating and separating valve 3032 serving as an insulating mechanism and a high speed grounding device 3040 in order from the color change valve CVb side toward the coating gun 3013 side.

The insulating and separating valve 3032 includes a female coupling member 3032U fixed to a movable member 3033 and a male coupling member 3032D making a pair with the female coupling member 3032U. The movable member 3033 is vertically moved by means of an air cylinder 3034 fixed to the ram 3014. When the movable member 3033 is moved downward, accordingly, the female coupling member 3032U is connected to the male coupling member 3032D. Consequently, it is possible to supply the coating material from the coating material supplying source 3021 to the intermediate reservoir 3012. When the movable member 3033 is moved upward, moreover, the female coupling member 3032U is separated from the male coupling member 3032D.

As will be described below in detail, when electrostatic coating is to be carried out through an application of a high voltage to the coating gun 3013, the female coupling member 3032U and the male coupling member 3032D in the insulating and separating valve 3032 are separated from each other. In the electrostatic coating, therefore, the coating material supplying path 3022 is divided into an application side which is conducted to the coating gun 3013 and a non-application side which is insulated from the coating gun 3013. More specifically, the coating gun 3013 side in the coating material supplying path 3022 with respect to the male coupling member 3032D is conducted to the coating gun 3013. Therefore, the same side serves as the application side in the electrostatic coating so that a high voltage is applied. On the other hand, the coating material supplying source 3021 side in the coating material supplying path 3022 with respect to the female coupling member 3032U is insulated from the coating gun 3013. Therefore, the same side serves as the non-application side in the electrostatic coating.

The high speed grounding device 3040 includes a joint portion 3041 provided in the coating material supplying path 3022, a discharging fluid supplying path 3042 connected to the joint portion 3041, and a supplying device 3043 for supplying the air (A) and the electrically conductive fluid (W) to the discharging fluid supplying path 3042, and discharges a residual electric charge of the coating material supplying path 3022 to which a high voltage is applied in the electrostatic coating.

Figure 19:
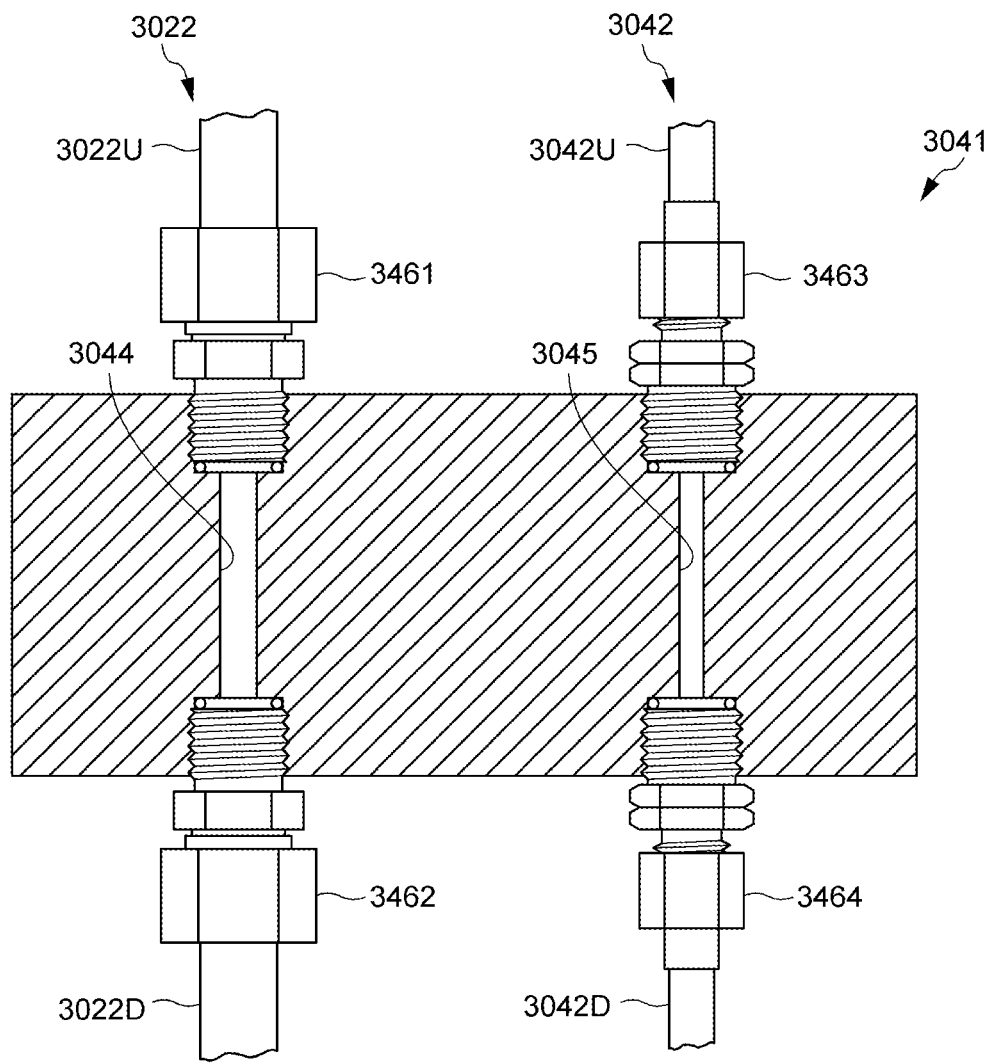
FIG. 19 is a sectional view showing a structure of a joint portion in a high speed grounding device according to the sixth exemplary embodiment.

FIG. 19 is a sectional view showing a structure of the joint portion 3041. The joint portion 3041 is almost plate-shaped and is formed by an electrically conductive material such as SUS. In the joint portion 3041, two passages including a coating material passage 3044 and a discharging passage 3045 are formed hollowly in parallel with each other.

An insulating and separating valve side 3022U of the coating material supplying path 3022 is connected to an inlet port of the coating material passage 3044 through a first coupling member 3461, and a coating valve side 3022D of the coating material supplying path 3022 is connected to an outlet port of the coating material passage 3044 through a second coupling member 3462. On the other hand, a supplying device side 3042U of the discharging fluid supplying path 3042 is connected to the inlet port of the discharging passage 3045 through a third coupling member 3463, and an outlet port side 3042D of the discharging fluid supplying path 3042 is connected to an outlet port side of the discharging passage 3045 through a fourth coupling member 3464. By connecting the coating material supplying path 3022 and the discharging fluid supplying path 3042 to the joint portion 3041 as described above, it is possible to conduct the discharging fluid supplying path 3042 to the application side of the coating material supplying path 3022. Moreover, the joint portion 3041 is accommodated in a protecting case formed by a resin (which is not shown).

Returning to FIG. 18, the supplying device 3043 includes a pump for supplying an electrically conductive fluid to the discharging fluid supplying path 3042 and an air compressor (not shown) for supplying air to the discharging fluid supplying path 3042, and furthermore, a discharging fluid supply switching valve 3046 for opening/closing a passage to connect the pump or the air compressor to the discharging fluid supplying path 3042. Consequently, it is possible to control a flow rate of the electrically conductive fluid or the air which flows through the discharging fluid supplying path 3042. In the exemplary embodiment, deionized water is used for the electrically conductive fluid to be supplied to the discharging fluid supplying path 3042 through the supplying device 3043. Moreover, the supplying device 3043 is connected to the controller 3500 and is operated based on a control signal sent from the controller 3500.

In addition, the discharging fluid supplying path 3042 is grounded on the supplying device 3043 side with respect to the joint portion 3041. In other words, the coating material supplying path 3022 is insulated from the grounding side in a state in which the electrically conductive fluid is not supplied into the discharging fluid supplying path 3042. On the other hand, when the electrically conductive fluid is supplied from the supplying device 3043 into the discharging fluid supplying path 3042, the coating material supplying path 3022 is conducted to the grounding side through the electrically conductive fluid in the joint portion 3041 and the discharging fluid supplying path 3042.

As a mechanism for cleaning the insulating and separating valve 3032 or the coating material supplying path 3022, moreover, a second cleaning valve SVb2, a cleaning fluid supply switching valve 3035 and a cleaning fluid discharge switching valve 3036 are connected to the insulating and separating valve 3032. The second cleaning valve SVb2 controls a supply of the air (A) and the cleaning fluid (W) which are to be used in the cleaning work for the insulating and separating valve 3032. The cleaning fluid supply switching valve 3035 controls the supply of the air or the cleaning fluid from the second cleaning valve SVb2 to the female coupling member 3032U. The cleaning fluid discharge switching valve 3036 controls a discharge of the air or the cleaning fluid from the female coupling member 3032U.

In the electrostatic coating apparatus 3001 having the structure described above, electrostatic coating and a color change for a coating material are carried out by the controller 3500 in the following procedure. First of all, the female coupling member 3032U and the male coupling member 3032D in the insulating and separating valve 3032 are connected to each other and a coating material having a predetermined color is then supplied from the coating material supplying source 3021 to the intermediate reservoir 3012. When the supply of the coating material to the intermediate reservoir 3012 is ended, subsequently, the female coupling member 3032U and the male coupling member 3032D in the insulating and separating valve 3032 are separated from each other. Next, a high voltage is applied to the coating gun 3013 and the coating material stored in the intermediate reservoir 3012 is charged and sprayed onto an object to be coated.

Subsequently to the electrostatic coating described above, moreover, the color change for the coating material is carried out in the following procedure. First of all, when the application of the high voltage to the coating gun 3013 is ended and the electrostatic coating is thus completed, the high speed grounding device 3040 is driven to discharge the residual electric charge on the coating material supplying path 3022 side. More specifically, the electrically conductive fluid is started to be supplied from the supplying device 3043 to the discharging fluid supplying path 3042. Consequently, the residual electric charge in the coating material supplying path 3022 is discharged. After the discharge of the residual electric charge in the coating material supplying path 3022 is completed, furthermore, the supply of the electrically conductive fluid from the supplying device 3043 is stopped and the supply of the air is started. Thus, the electrically conductive fluid in the discharging fluid supplying path 3042 is discharged so that the coating material supplying path 3022 is brought into an insulating state from the grounding side.

Next, the female coupling member 3032U and the male coupling member 3032D in the insulating and separating valve 3032 are connected to each other and the cleaning valves SVb1 to SVb3 are then driven to clean the coating material supplying path 3022, the insulating and separating valve 3032, the intermediate reservoir 3012 and the coating gun 3013. Thereafter, a predetermined coating material is started to be supplied to the coating material supplying path 3022.

Figure 20:
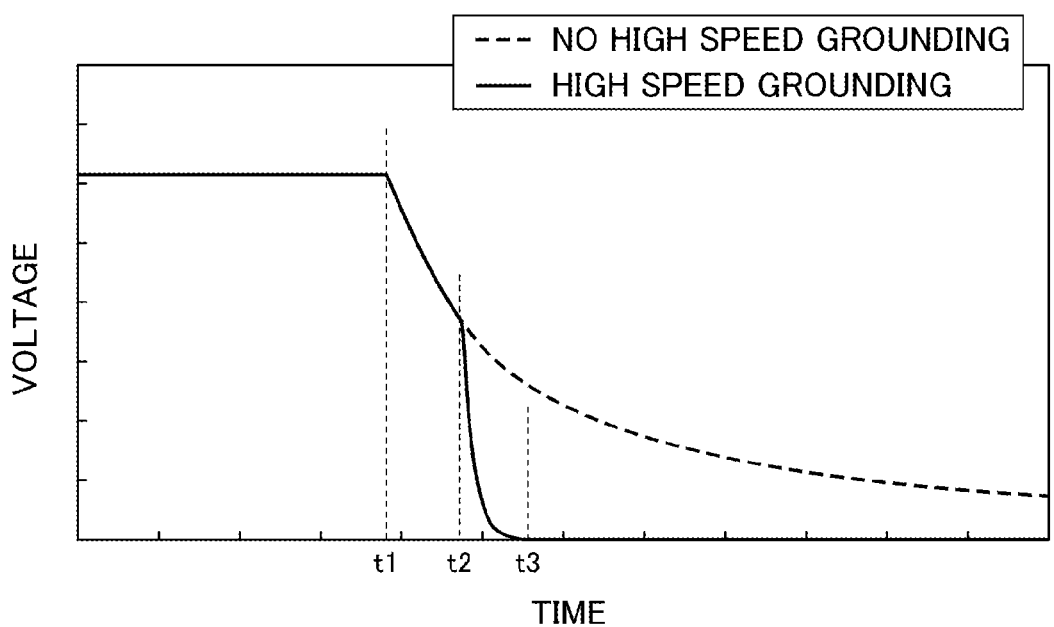
FIG. 20 is a chart showing a time variation in a voltage value of a coating material supplying path after an end of an application of a high voltage.

FIG. 20 is a chart showing a time variation in a voltage value of the coating material supplying path 3022 after the end of the application of the high voltage. In the case in which the high speed grounding device 3040 is not used, that is, the deionized water is not supplied to the discharging fluid supplying path 3042, the voltage value of the coating material supplying path 3022 is reduced gradually through a spontaneous discharge after the application of the high voltage is ended at a time t1 as shown in a broken line of FIG. 20.

On the other hand, in the case in which the high speed grounding device 3040 is used, it is possible to discharge the residual electric charge in the coating material supplying path 3022 more rapidly than in the case in which the high speed grounding device 3040 is not used as shown in a solid line of FIG. 20. More specifically, the deionized water is started to be supplied from the supplying device 3043 to the discharging fluid supplying path 3042 immediately after the application of the high voltage is ended at the time t1. At a time t2, then, the coating material supplying path 3022 and the grounding side are conducted through the deionized water flowing through the discharging fluid supplying path 3042 depending on the arrival of the deionized water supplied from the supplying device 3043 at the joint portion 3041 so that the residual electric charge in the coating material supplying path 3022 is discharged to the grounding side. Consequently, the voltage value of the coating material supplying path 3022 is reduced after the time t2 and reaches almost zero at a time t3.

According to the sixth exemplary embodiment, the following advantages can be obtained.

(1) There are provided the discharging fluid supplying path 3042 conducted to a part on the application side of the coating material supplying path 3022 through the joint portion 3041 and grounded, and the supplying device 3043 for supplying the electrically conductive fluid to the discharging fluid supplying path 3042. Consequently, the electric charge left on the application side of the coating material supplying path 3022 through the application of the high voltage to the coating gun 3013 can be rapidly discharged to the grounding side through the electrically conductive fluid flowing through the discharging fluid supplying path 3042.

Also in the case in which the electrically conductive fluid is caused to flow through the separate discharging fluid supplying path 3042 from the coating material supplying path 3022 so that a leakage or a spark occurs, moreover, the coating material supplying path 3022 can be prevented from being damaged. Accordingly, it is possible to prevent a deterioration in a cleaning property of the coating material supplying path 3022. Also in the case in which there is caused such a damage that the discharging fluid supplying path 3042 is to be replaced, furthermore, it is possible to carry out the replacement more inexpensively than that in the case in which the coating material supplying path 3022 is replaced. In addition, there is no possibility that the electrically conductive fluid might mix with the coating material. Therefore, it is possible to use various fluids in addition to the deionized water as the electrically conductive fluid.

(2) After the application of the high voltage to the coating gun 3013 is ended, the electrically conductive fluid is started to be supplied to the discharging fluid supplying path 3042. Consequently, it is possible to rapidly discharge the electric charge left on the application side of the coating material supplying path 3022 after the electrostatic coating. Thus, it is possible to reduce a time taken for connecting the insulating and separating valve 3032. Accordingly, it is possible to quickly start the work for cleaning the coating material supplying path 3022 or the insulating and separating valve 3032 after the electrostatic coating. Thus, it is possible to enhance a coating efficiency.

(3) By using, as the electrically conductive fluid, the deionized water having a smaller amount of impurity such as chlorine than clean water, it is possible to prevent a current from leaking in non-grounding.

(4) The electrically conductive fluid is supplied to the discharging fluid supplying path 3042 to discharge the residual electric charge from the application side of the coating material supplying path 3022, and the air is then supplied to the discharging fluid supplying path 3042 through the supplying device 3043. Consequently, it is possible to discharge the electrically conductive fluid left in the discharging fluid supplying path 3042. Thus, it is possible to prevent a current from leaking out of the application side of the coating material supplying path 3022 through the discharging fluid supplying path 3042 while the electrically conductive fluid is not supplied.

Although the insulating and separating valve 3032 serving as the insulating mechanism is provided in the coating material supplying path 3022 to divide the coating material supplying path 3022 into the application side and the non-application side in the sixth exemplary embodiment, the invention is not restricted thereto. For instance, it is also possible to provide an insulating tube in the coating material supplying path, thereby dividing the coating material supplying path into the application side and the non-application side.

INDUSTRIAL APPLICABILITY

The invention can be utilized in an electrostatic coating apparatus for applying a high voltage to an electrically conductive coating material, thereby carrying out coating.

EXPLANATION OF DESIGNATION

1 electrostatic coating apparatus
11 coating material supplying path
13 coating gun
18 movable member
19 air cylinder
32 insulating and separating valve
32D male coupling member
32U female coupling member 52 concave portion
53 coating material supplying passage
54 connecting portion
55a cleaning fluid supplying hole
56a cleaning fluid discharging hole
61a guide portion
62 convex portion
63 coating material supplying passage
64 connecting portion
100 separating mechanism
201 seal member
2001 electrostatic coating apparatus
2013 coating gun
2012 intermediate reservoir
2021 coating material supplying source
2022 coating material supplying path
2032, 2232 insulating and separating valve (connecting device)
2032U, 2232U female coupling member
2052 concave portion
2053 first coating material passage
2054 first connecting portion
2055 cleaning fluid supplying hole
2056 cleaning fluid discharging hole
2032D, 2232D male coupling member
2062 convex portion
2063 second coating material passage
2064 second connecting portion
2065, 2265 seal member holding portion
2066, 2266 seal member
2100 separating mechanism
2111 main cylinder (first operating mechanism)
2113 cylinder for cleaning position (second operating mechanism)
3001 electrostatic coating apparatus
3013 coating gun
3021 coating material supplying source
3022 coating material supplying path
3032 insulating and separating valve (insulating mechanism)
3032U female coupling member
3032D male coupling member
3040 high speed grounding device
3041 joint portion
3042 discharging fluid supplying path (fluid supplying path)
3043 supplying device (fluid supplying device, gas supplying device)

The invention claimed is:

1. A connecting device for a fluid passage comprising:
a female coupling member having a first connecting portion on one end side thereof;
a male coupling member having, on one end side thereof, a second connecting portion to be connected to the first connecting portion, a passage formed in the female coupling member and a passage formed in the male coupling member being connected to each other through a connection of the first connecting portion and the second connecting portion;
a first operating mechanism for driving one of the female coupling member and the male coupling member to cause the first connecting portion and the second connecting portion to approach each other;
a second operating mechanism for driving said one of the female coupling member and the male coupling member to separate the first connecting portion and the second connecting portion from each other; and
a controller configured to control a thrust generated in each of the first operating mechanism and the second operating mechanism,
wherein one of the female coupling member and the male coupling member includes a supplying hole for supplying a cleaning fluid toward the first connecting portion and the second connecting portion, and a discharging hole for discharging the cleaning fluid from the first connecting portion and the second connecting portion,
wherein one of the female coupling member and the male coupling member is provided with a seal member for closely coming in contact with an opposing one of the female coupling member and the male coupling member, and
wherein, when cleaning the first connecting portion and the second connecting portion with the cleaning fluid, the controller controls the thrust generated in the first operating mechanism to be greater than a cleaning fluid supply force, which is generated by the supply of the cleaning fluid through the supplying hole and acts in a direction as to separate the first connecting portion and the second connecting portion from each other against the thrust generated in the first operating mechanism, and to be equal to or smaller than the thrust generated in the second operating mechanism, and controls the first operating member and the second operating member so as to separate the first connecting portion and the second connecting portion from each other within a range in which the seal member closely comes in contact with the opposing one of the female coupling member and the male coupling member.

2. The connecting device for a fluid passage according to claim 1, wherein each of the first operating mechanism and the second operating mechanism is constituted by an air cylinder for generating the thrust through a supply of compressed air, and
wherein a cylinder diameter of the air cylinder of the second operating mechanism is larger than that of the air cylinder of the first operating mechanism.

3. The connecting device for a fluid passage according to claim 1, wherein the cleaning fluid is deionized water.

* * * * *